May 18, 1965 V. W. SPARROW 3,184,160

DATA RECORDING MACHINES

Filed July 18, 1961 27 Sheets-Sheet 1

INVENTOR

Vernon Watkins Sparrow

BY

Pennie, Edmonds, Morton, Taylor & Adams

ATTORNEYS

May 18, 1965 V. W. SPARROW 3,184,160

DATA RECORDING MACHINES

Filed July 18, 1961 27 Sheets-Sheet 2

INVENTOR

Vernon Watkins Sparrow

BY

Pennie, Edmonds, Morton, Taylor & Adams

ATTORNEYS

INVENTOR
Vernon Watkins Sparrow
BY
Pennie, Edmonds, Morton, Taylor & Adams
ATTORNEYS May 18, 1965 V. W. SPARROW 3,184,160

DATA RECORDING MACHINES

Filed July 18, 1961 27 Sheets-Sheet 4

INVENTOR

Vernon Watkins Sparrow

BY

Kennie, Edmonds, Morton, Taylor & Adams

ATTORNEYS

INVENTOR
Vernon Watkins Sparrow
BY
Pennie, Edmonds, Morton, Taylor & Adams
ATTORNEYS INVENTOR
Vernon Watkins Sparrow
BY
Rennie, Edmonds, Morton, Taylor & Adams
ATTORNEYS INVENTOR
Vernon Watkins Sparrow
BY
Pennie, Edmonds, Morton, Taylor + Adams
ATTORNEYS INVENTOR
Vernon Watkins Sparrow
BY
Pennie, Edmonds, Morton, Taylor & Adams
ATTORNEYS INVENTOR
Vernon Watkins Sparrow
BY
Pennie, Edmonds, Morton, Taylor & Adams
ATTORNEYS May 18, 1965 V. W. SPARROW 3,184,160

DATA RECORDING MACHINES

Filed July 18, 1961

27 Sheets-Sheet 10

INVENTOR

Vernon Watkins Sparrow

BY

Pennie, Edmonds, Morton, Taylor & Adams

ATTORNEYS

May 18, 1965 V. W. SPARROW 3,184,160

DATA RECORDING MACHINES

Filed July 18, 1961 27 Sheets-Sheet 11

INVENTOR

Vernon Watkins Sparrow

BY

Pennie, Edmonds, Morton, Taylor & Adams

ATTORNEYS

May 18, 1965 V. W. SPARROW 3,184,160

DATA RECORDING MACHINES

Filed July 18, 1961

27 Sheets-Sheet 12

INVENTOR

Vernon Watkins Sparrow

BY

Pennie, Edmonds, Morton, Taylor & Adams

ATTORNEYS

May 18, 1965 V. W. SPARROW 3,184,160

DATA RECORDING MACHINES

Filed July 18, 1961 27 Sheets-Sheet 13

INVENTOR

Vernon Watkins Sparrow

BY

Pennie, Edmonds, Morton, Taylor & Adams

ATTORNEYS

May 18, 1965 V. W. SPARROW 3,184,160

DATA RECORDING MACHINES

Filed July 18, 1961 27 Sheets-Sheet 14

INVENTOR

Vernon Watkins Sparrow

BY

Pennie, Edmonds, Morton, Taylor & Adams

ATTORNEYS

INVENTOR
Vernon Watkins Sparrow
BY
Pennie, Edmonds, Morton, Taylor & Adams
ATTORNEYS INVENTOR
Vernon Watkins Sparrow
BY
Pennie, Edmonds, Morton, Taylor & Adams
ATTORNEYS INVENTOR
Vernon Watkins Sparrow
BY
Pennie, Edmonds, Morton, Taylor & Adams
ATTORNEYS INVENTOR
Vernon Watkins Sparrow
BY
Pennie, Edmonds, Morton, Taylor & Adams
ATTORNEYS

INVENTOR

Vernon Watkins Sparrow

BY

Pennie, Edmonds, Morton, Taylor & Adams

ATTORNEYS

INVENTOR
Vernon Watkins Sparrow
BY
Pennie, Edmonds, Morton, Taylor & Adams
ATTORNEYS

INVENTOR

Vernon Watkins Sparrow

BY

Pennie, Edmonds, Morton, Taylor & Adams

ATTORNEYS

DATA RECORDING MACHINES

Filed July 18, 1961 27 Sheets-Sheet 22

INVENTOR
Vernon Watkins Sparrow
BY
Pennie, Edmonds, Morton, Taylor & Adams
ATTORNEYS INVENTOR
Vernon Watkins Sparrow
BY
Pennie, Edmonds, Morton, Taylor & Adams
ATTORNEYS May 18, 1965 V. W. SPARROW 3,184,160

DATA RECORDING MACHINES

Filed July 18, 1961 27 Sheets-Sheet 24

INVENTOR
Vernon Watkins Sparrow
BY
Pennie, Edmonds, Morton, Taylor & Adams
ATTORNEYS INVENTOR
Vernon Watkins Sparrow
BY
Pennie, Edmonds, Morton, Taylor & Adams
ATTORNEYS May 18, 1965 V. W. SPARROW 3,184,160

DATA RECORDING MACHINES

Filed July 18, 1961 27 Sheets-Sheet 26

INVENTOR

Vernon Watkins Sparrow

BY

Pennie, Edmonds, Morton, Taylor & Adams

ATTORNEYS

INVENTOR
Vernon Watkins Sparrow
BY
Pennie, Edmonds, Morton, Taylor & Adams
ATTORNEYS

United States Patent Office 3,184,160
Patented May 18, 1965

3,184,160
DATA RECORDING MACHINES
Vernon Watkins Sparrow, London, England, assignor to Bell Punch Company Limited
Filed July 18, 1961, Ser. No. 124,890
22 Claims. (Cl. 235—60.15)

This invention relates to data recording machines.

The invention has particularly in mind to provide a machine, hereinafter referred to as a credit sales machine, effective to facilitate the handling of credit sale repayments, the machine being designed to produce a printed record in characters suitable for personal recognition and also for recognition mechanically by an automatic data reading machine, for example, the Electronic Reading Automation manufactured by Messrs. Solartron Electronic Business Machines Limited.

With this object in view the invention provides a credit sales machine which embodies a system using (1) a customer's record card which is printed in the machine with the data to be recorded, such data being described later, (2) two tally rolls, one primarily intended for analysis at the head office of the company undertaking the credit transaction and the other to serve as a duplicate copy at the branch office at which the instalment payments are made, and (3) a printing type face which is used in the machine to print the customer's account number on the tally rolls, the printing type face being either carried on a part which is a separate entity (hereinafter referred to as a "token") from the record card, or incorporated with the card. In the latter case the card may be of the type described and illustrated in our co-pending United Kingdom patent application No. 28,903/58.

The machine may have a manually operable keyboard by means of which a plurality of type wheels incorporated in the machine is set to printing position and an operating handle which, upon rotation, causes the data represented by the position of the type wheels, as set by means of the keyboard, to be printed on the record card and tally rolls.

The arrangement in this event may be one in which a single operating handle is used to perform the whole of the machine cycle, following the setting of the type wheels. Alternatively it may be one in which two operating handles are employed, operable one after the the other and allocated respectively to the performance of successive phases of the machine cycle, including, for example, a first phase of the printing operation and a second phase of that operation. The latter arrangement may be employed, for instance, with the use of a record card of the aforesaid type described and illustrated in our co-pending application No. 28,903/58. In this case the operating handle which is first operated occasions by its rotation the printing of the customer's account number on the tally rolls and the other operating handle occasions by its rotation the printing of the remainder of the data to be recorded in the machine, including the instalment value.

The machine may be designed for recording both the instalment payments and also the new balance owing. For convenience in the further description of the invention and similarly in the appended claims, the first of these values will be referred to as the "instalment" and the second as the "new balance," the balance at the time of payment of the instalment being referred to as the "old balance."

In this event the machine may comprise two groups of type wheels, a "first" group allocated to the printing of the instalment and a "second" group allocated to the printing of the new balance, a first type wheel setting unit (hereinafter referred to as the "validating unit") drivingly connected to said "first" group of type wheels, a second type wheel setting unit (hereinafter referred to as the "subtraction unit") drivingly connected to said second group of type wheels, a keyboard common to the two groups of type wheels, and interconnecting means effective to provide an operative connection between the keys of the keyboard and the two groups of type wheels through the two type wheel setting units, the arrangement being such that by first operating the keyboard to enter the old balance and then re-operating it to enter the instalment the net effect of these two operaions will be to set the first group of type wheels at a printing position representing the value of the instalment and the second group of type wheels at a printing position representing the value of the new balance.

Conveniently, as in the particular embodiment of the invention hereinafter described, the said interconnecting means may comprise a set of main racks operable selectively by the keys of the keyboard and in constant driving connection (i.e., during both stages of operation of the keyboard), each with a corresponding wheel train in the instalment unit in turn in constant driving connection with an associated type wheel of the first group, and a set of secondary racks also operable selectively by the keys of the keyboard and in driving connection each with a corresponding wheel train in the subtraction unit in turn in constant driving connection with an associated type wheel of the second group, only during the second stage of operation of the keyboard.

The secondary racks may be moved into and out of driving connection with the associated wheel trains by means of a transfer lever operable simultaneously on all of the racks.

Means may be provided for causing each wheel train of the subtraction unit which is connected to a higher type wheel to be operated in the direction to step back the associated type wheel by one digital distance whenever the numerical magnitude of the next lower digit of the instalment value upon entry of this value is greater than what it was prior to said entry.

The machine may incorporate a visible register for recording a running total of instalment payments in the use of the machine. This register may be arranged to be zeroised only by a responsible person in possession of a key.

Interlock mechanisms may be provided in the machine to ensure correct operation of the various integers of the machine.

The record card may be preprinted with the company heading and also with such relevant details as the address of the branch office, the customer's account number and the branch office number. The major portion of the card may be ruled to provide space for a given number of recordings of instalment payments, the new balance owing, the cashier's signature and the date of payment of the instalment. Of these items the instalment value, the balance owing and the date are printed in the machine. The cashier's signature is desirable in order to retain a sense of personal responsibility at the branch office at which the instalment payments are made.

The two tally rolls are preferably introduced into the machine as a composite roll containing the two rolls interwound with one another and with an interleaving of double faced one-time carbon paper, the two rolls becoming simultaneously printed with a record of the customer's account number and the amount of the instalment paid in.

The record primarily intended for analysis at the head office may conveniently be printed on plain paper. The other record, whilst primarily intended for use at the branch office, may also serve for head office analysis in the event of the prime (head office) copy going astray, for example in transit from branch office to head office.

Part of the back of the branch office tally roll strip may be coated with carbon for the purpose of recording the amount of the instalment payment on the record card.

The token hereinbefore referred to may be attached, for example, pivotally, to a wallet designed for holding the card, the wallet being of a convenient size and shape for carriage in the pocket. The token and the record card will thus be carried together, entered into the machine at the same time and removed together, so enabling the replacement of the record card and the token into the wallet to follow conveniently.

The invention will now be further described with reference to the accompanying drawings.

Figure 3A:
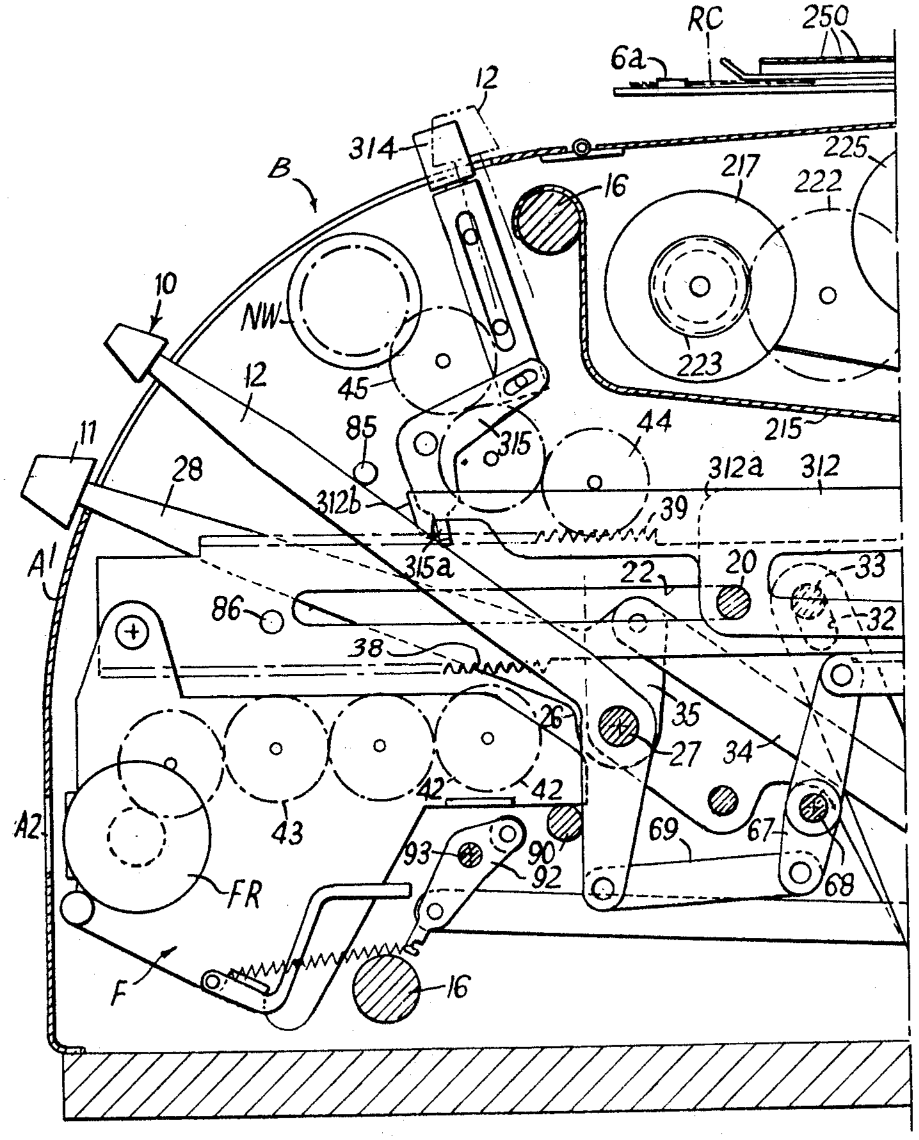
Figure 3B:
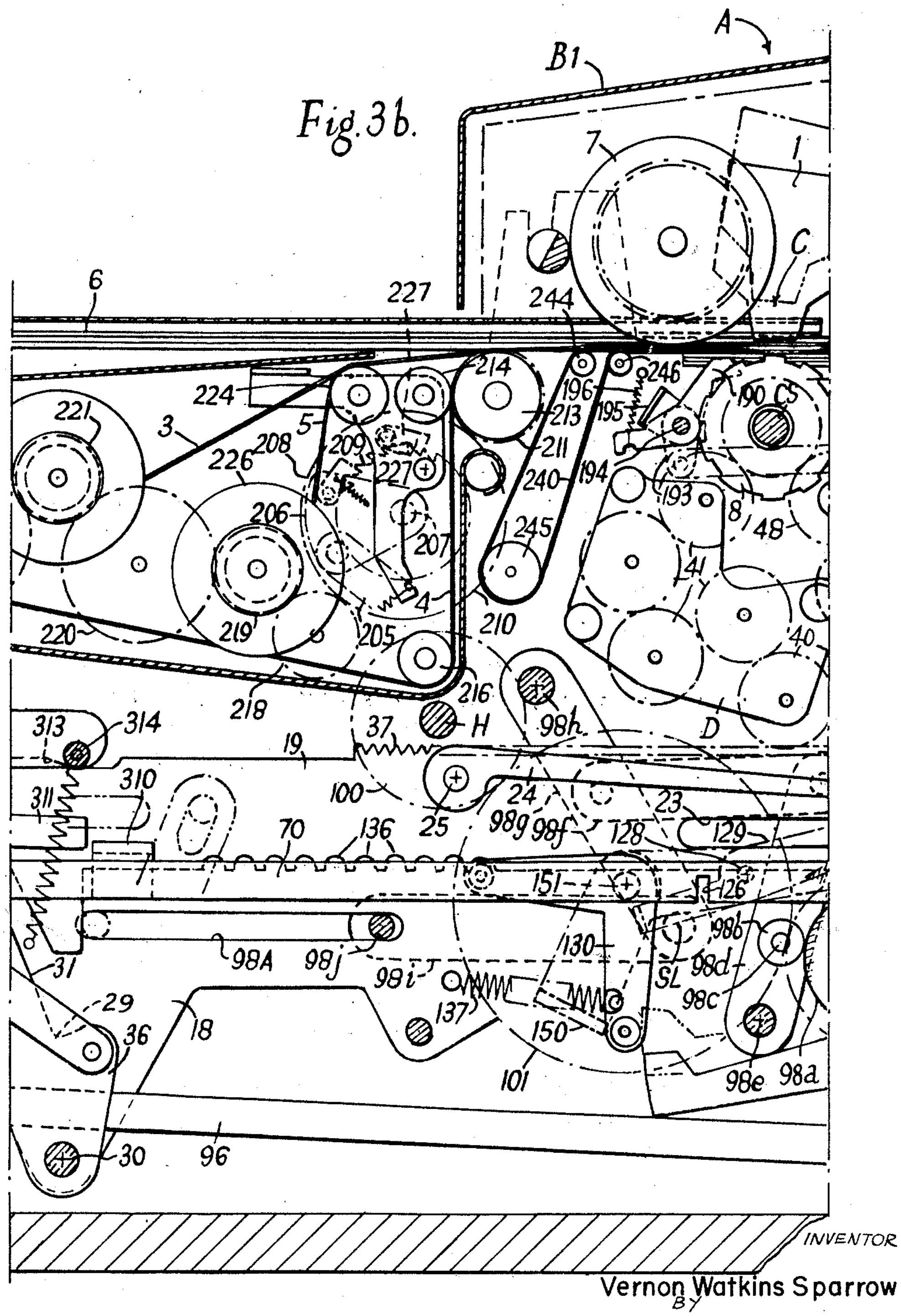
Figure 3C:
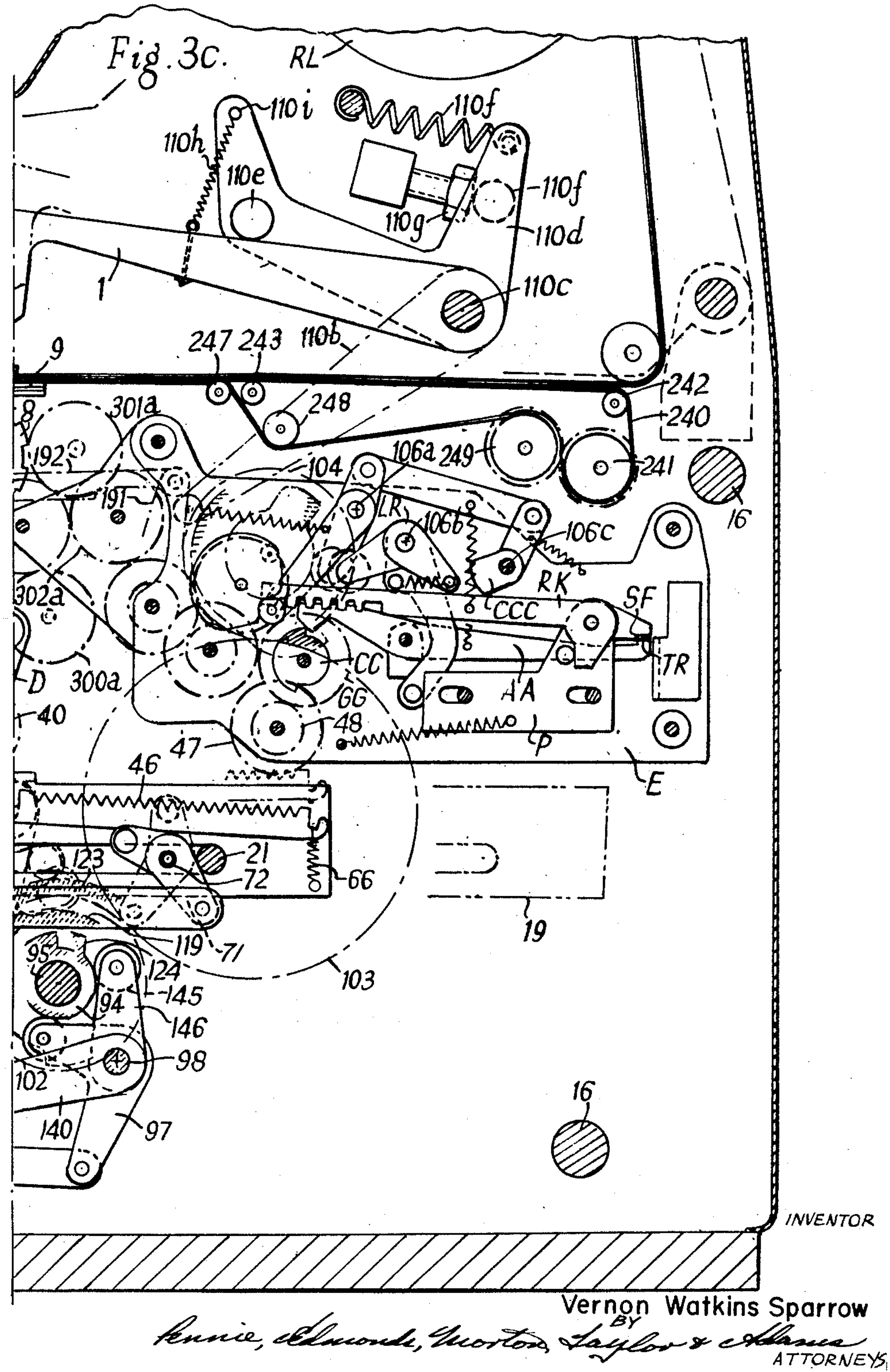
Figure 4A:
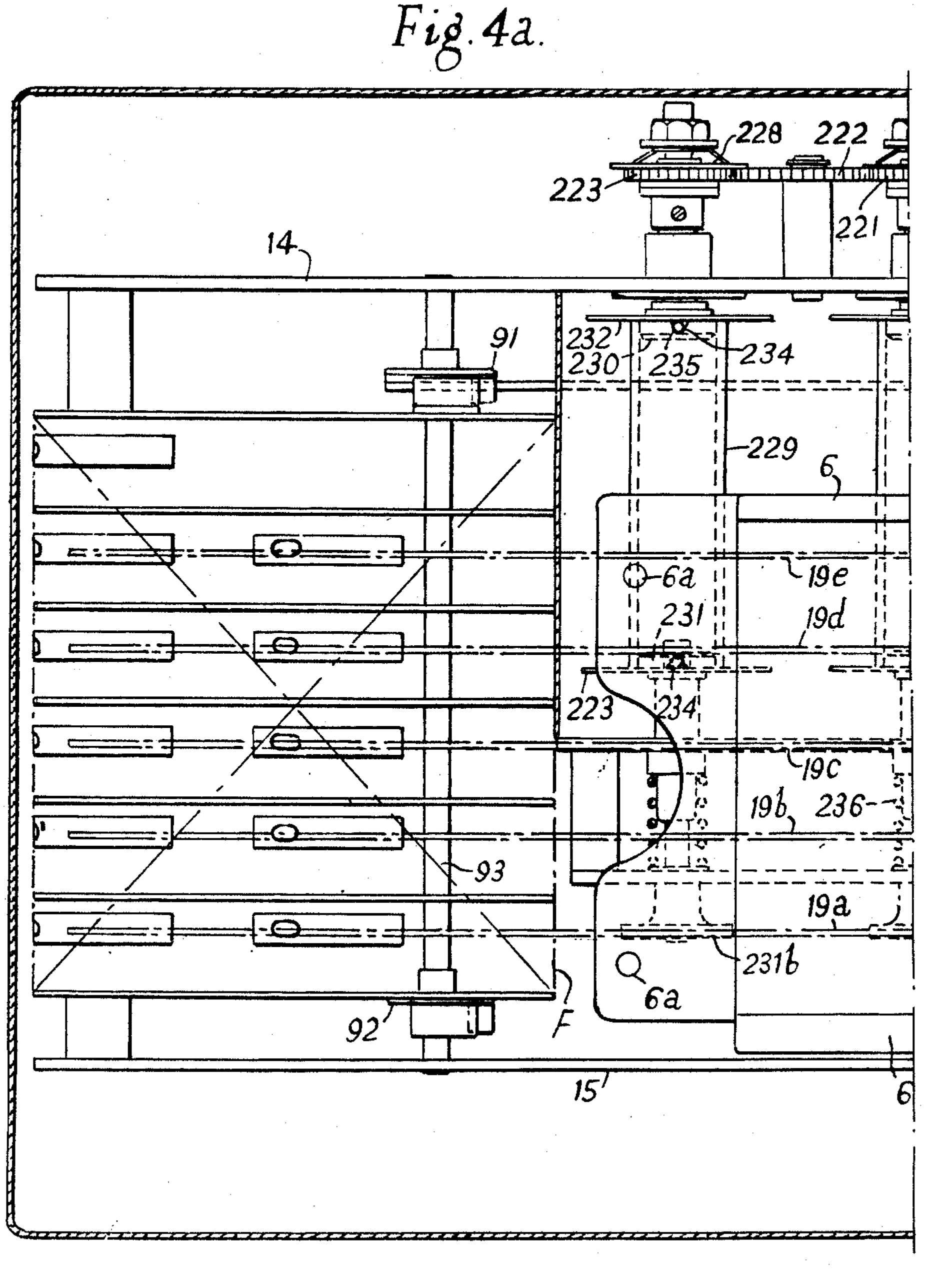
Figure 4B:
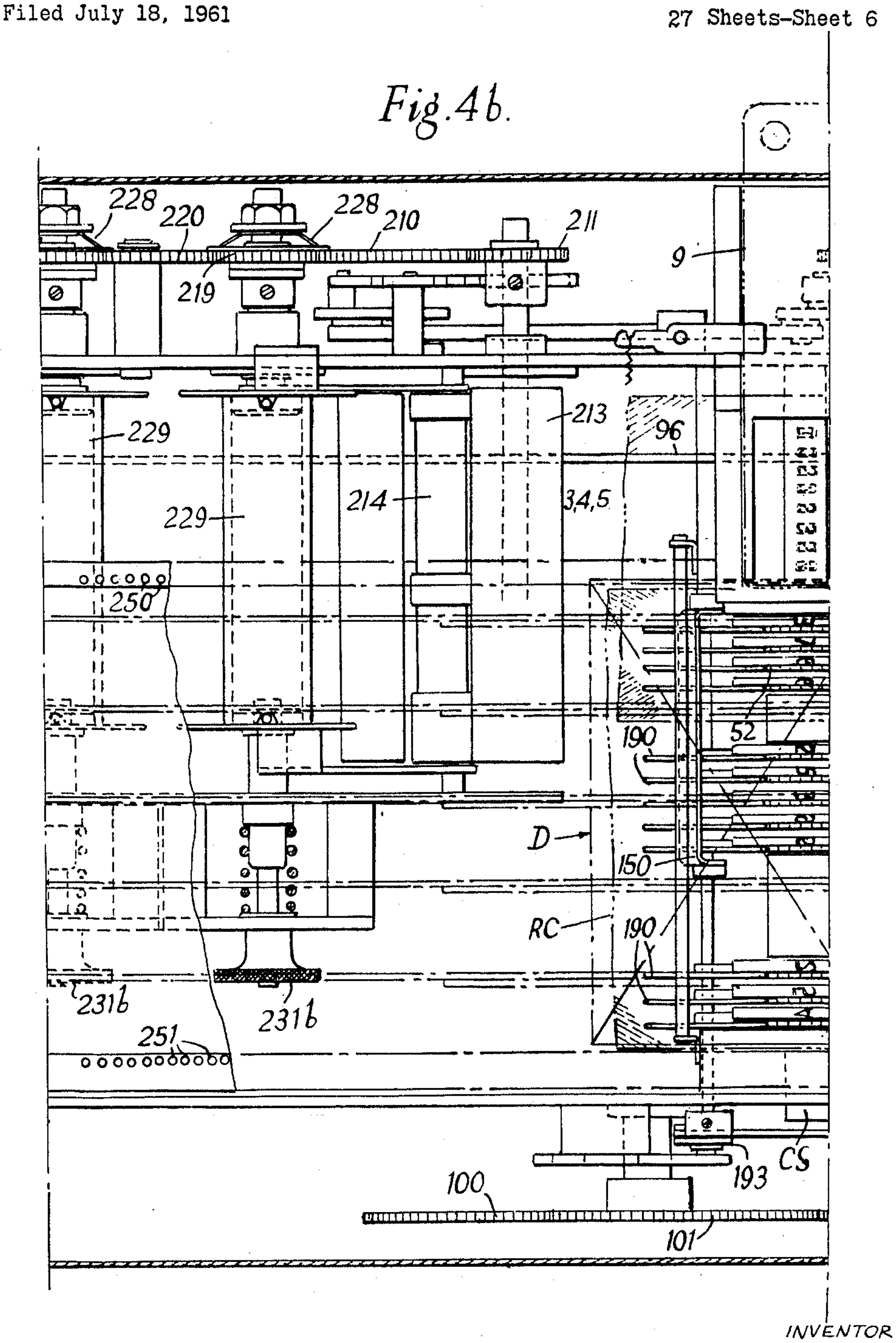
Figure 4C:
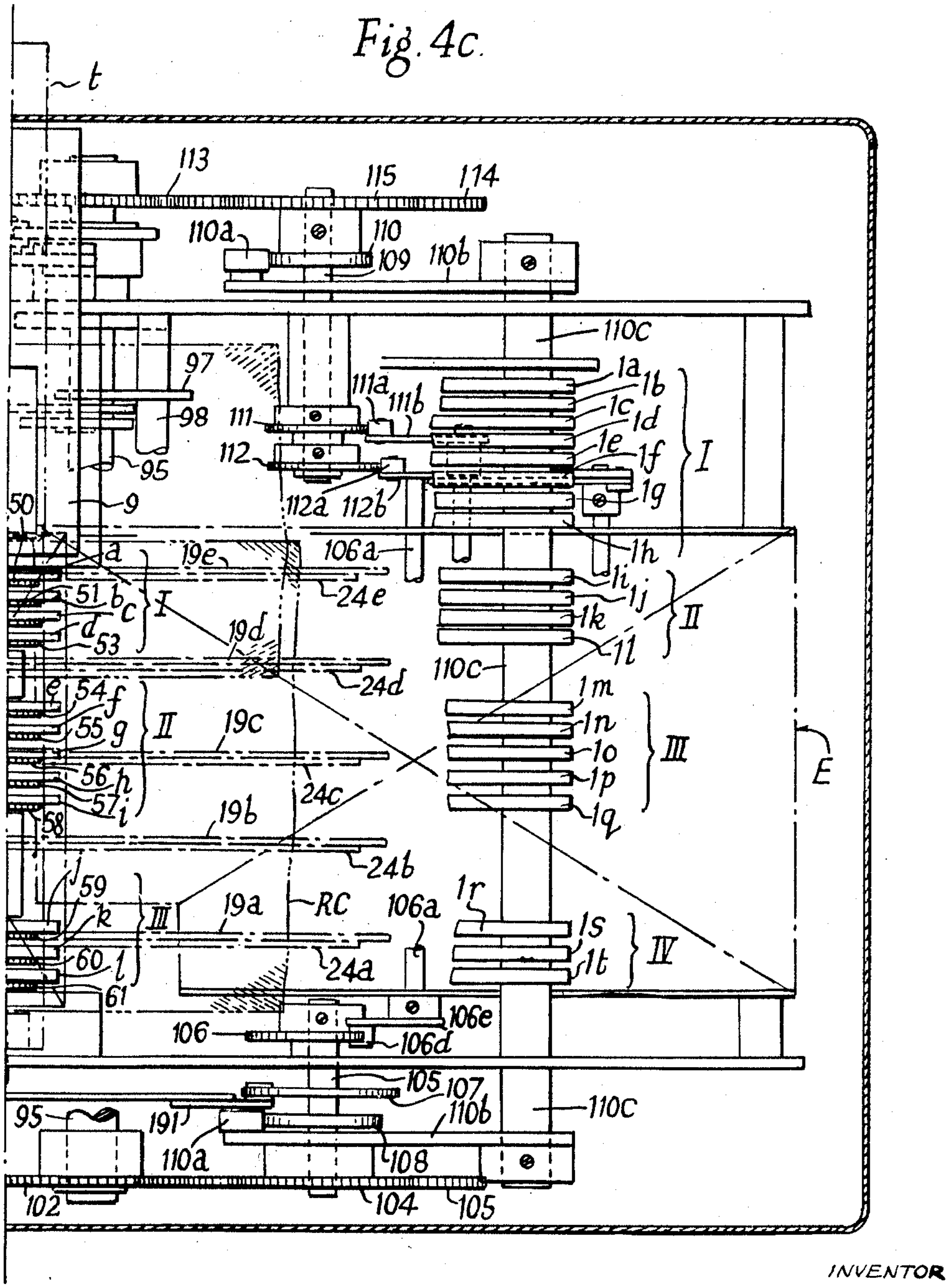
Figure 5A:
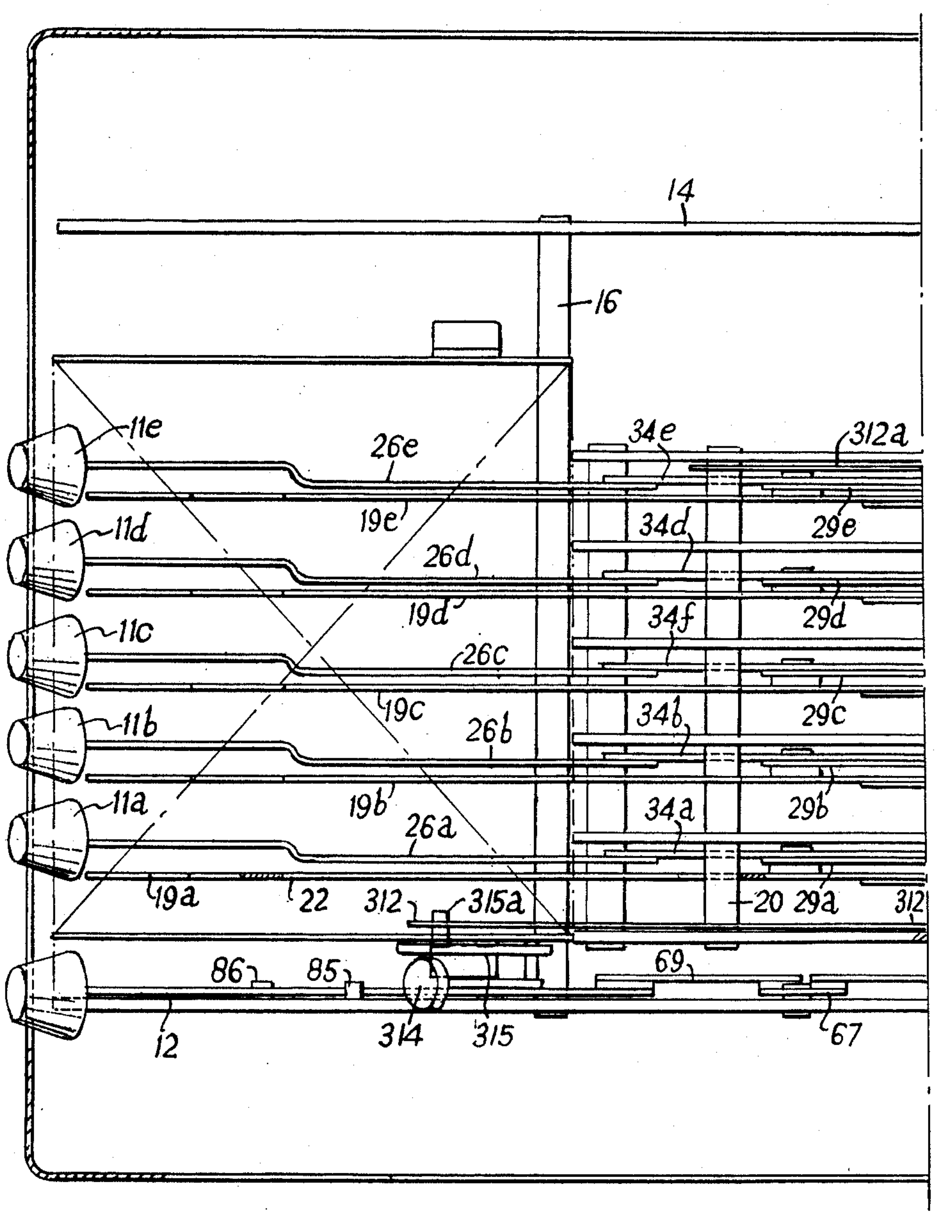
Figure 5B:
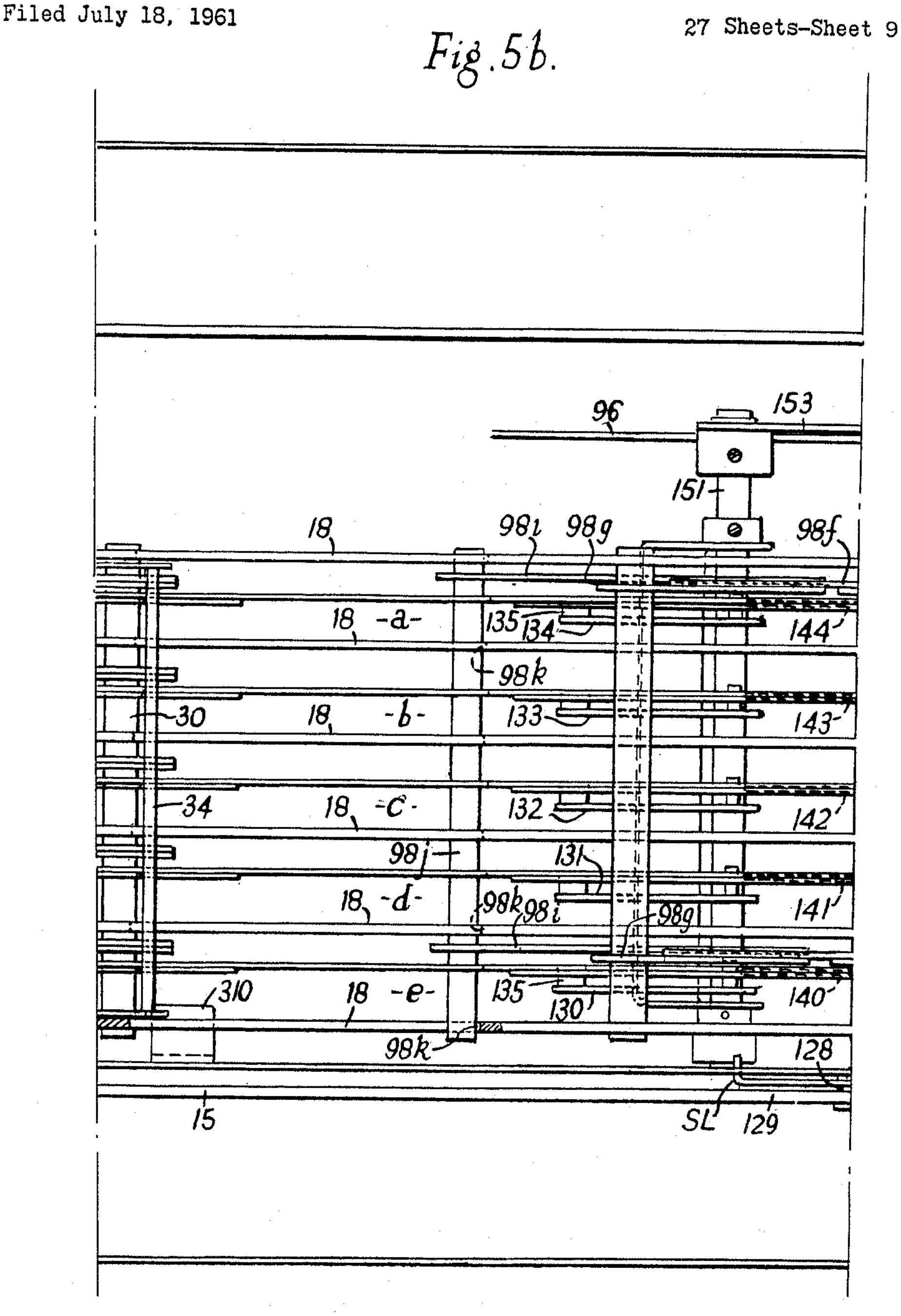
Figure 5C:
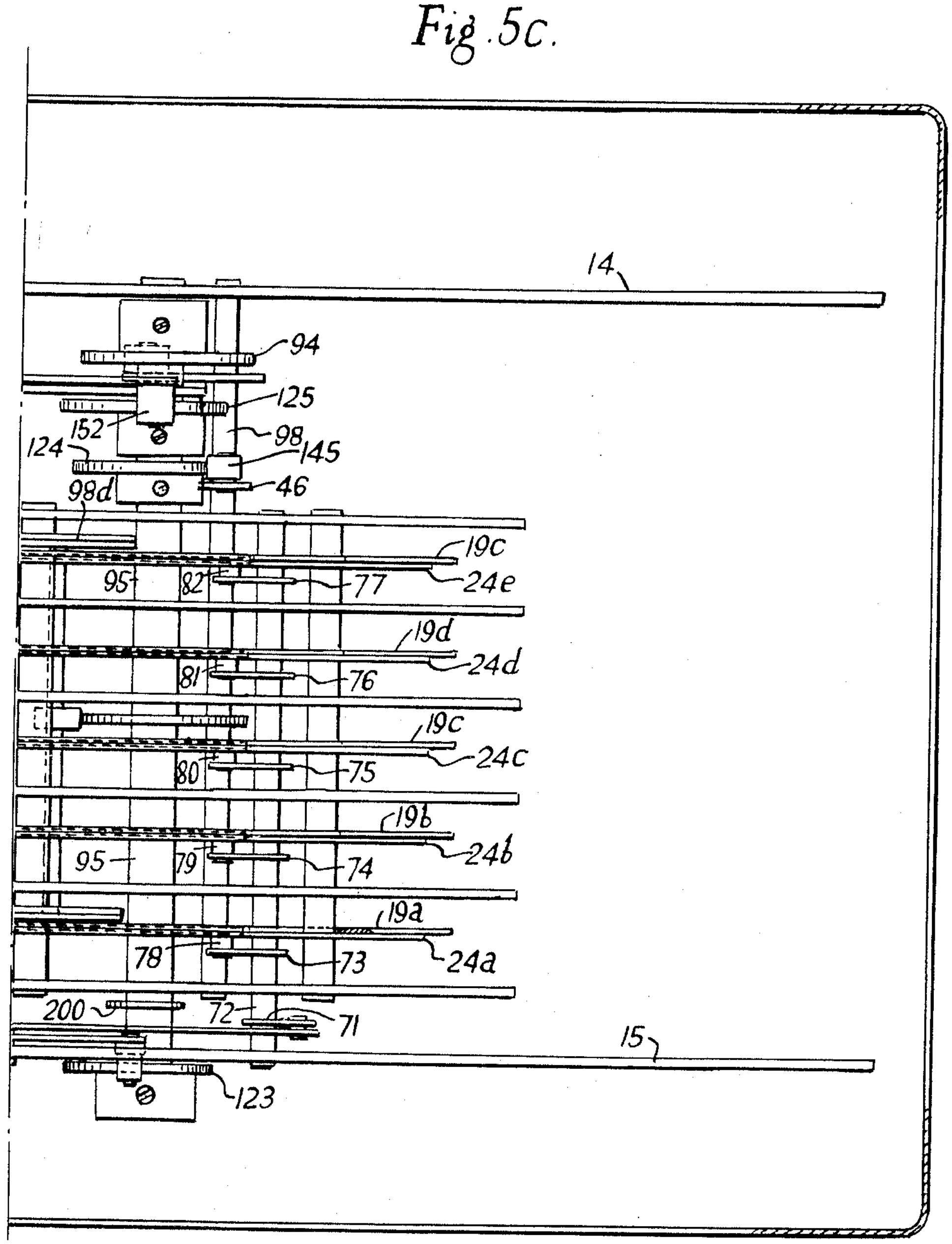
Figure 6:
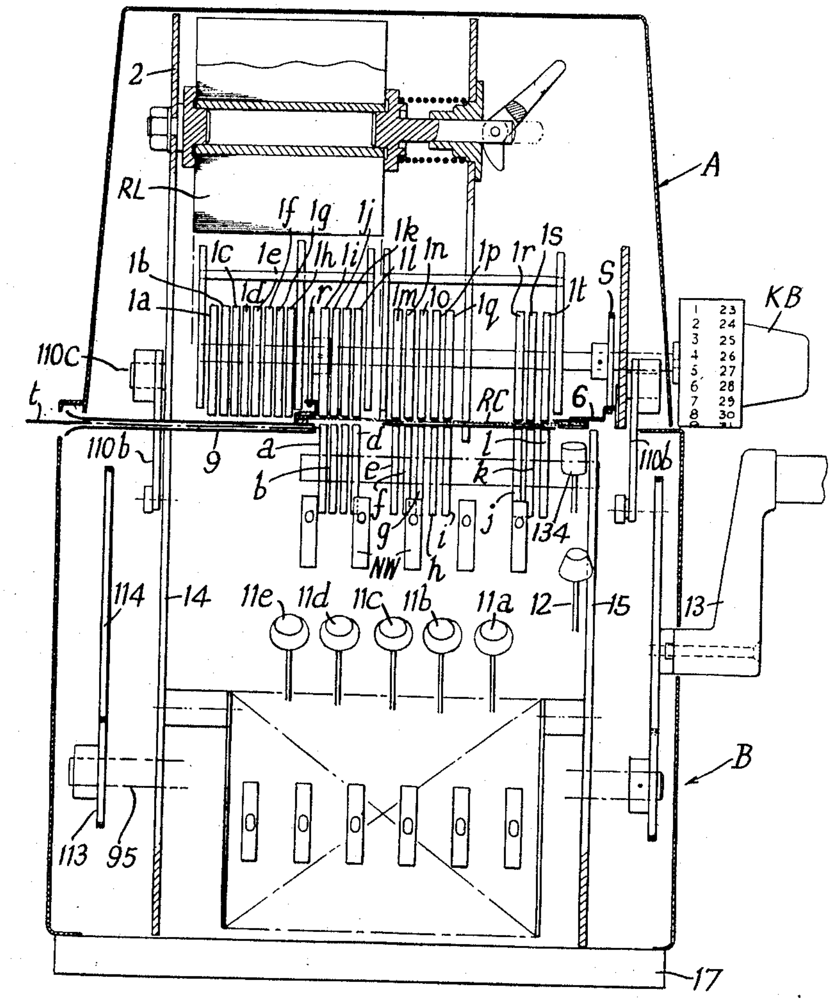
Figure 7:
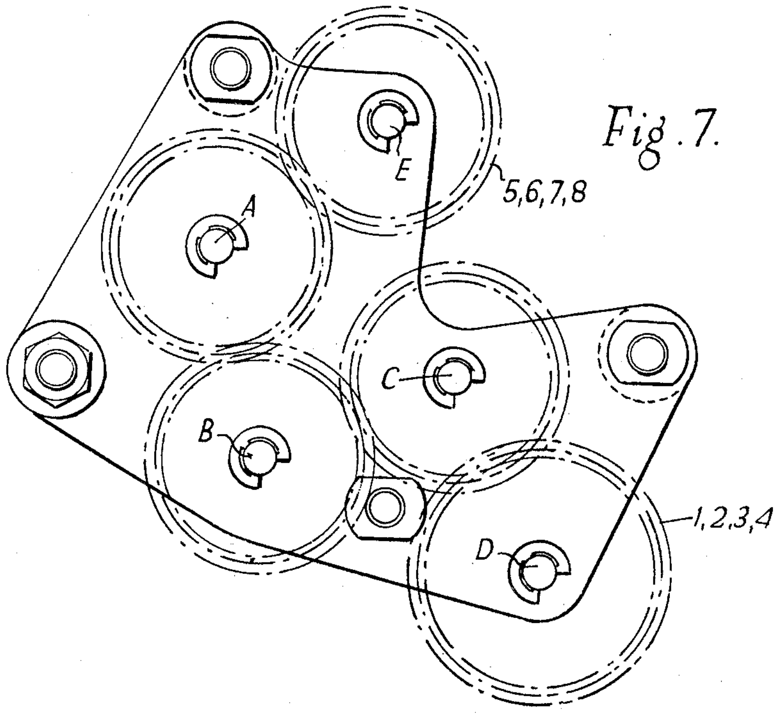
Figure 21:
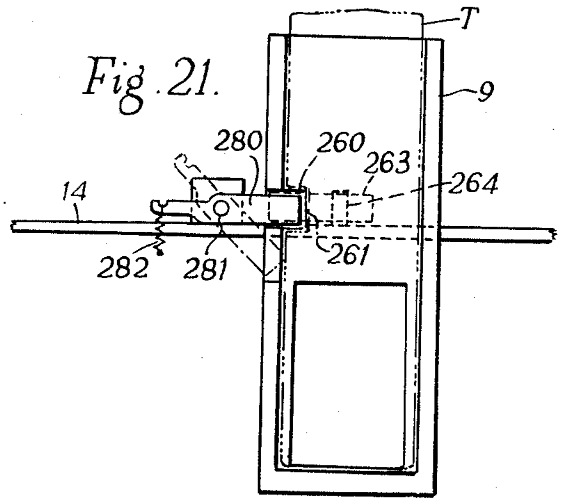
Figure 8:
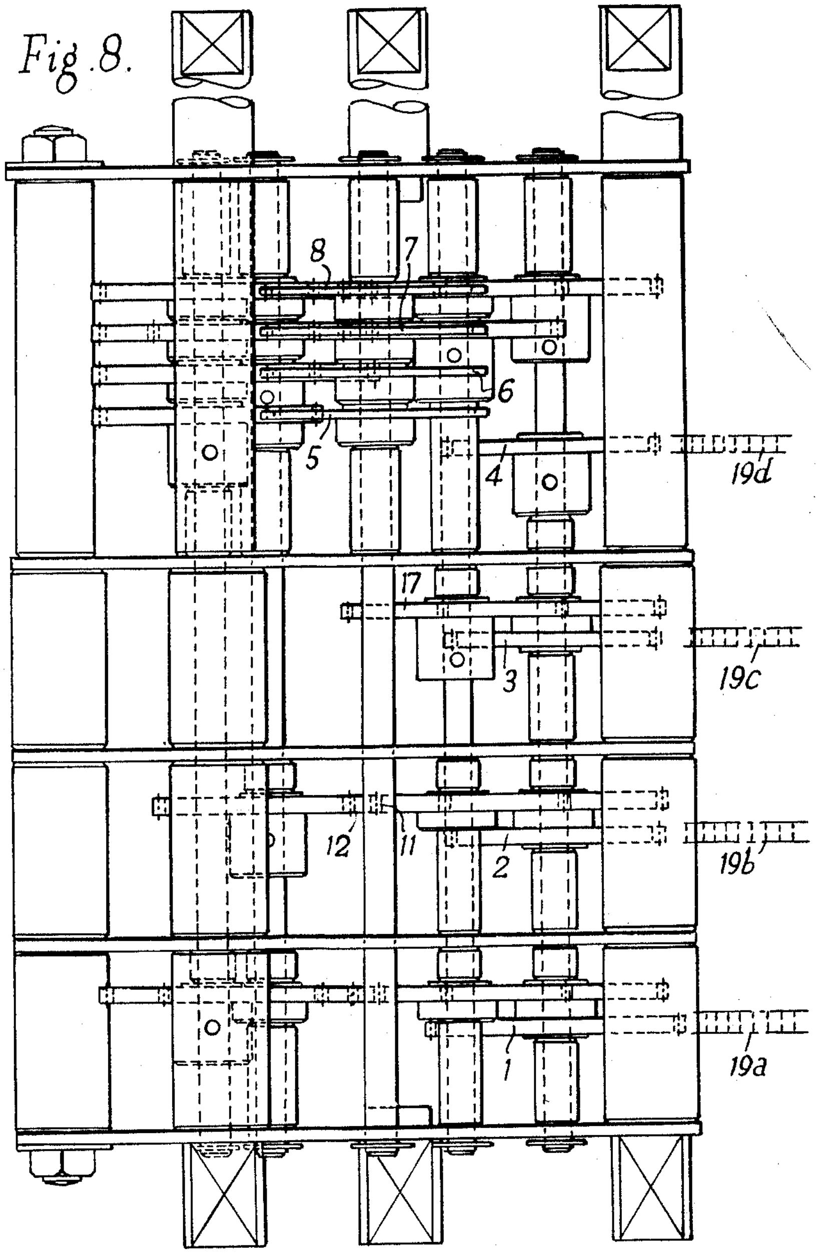
Figure 9:
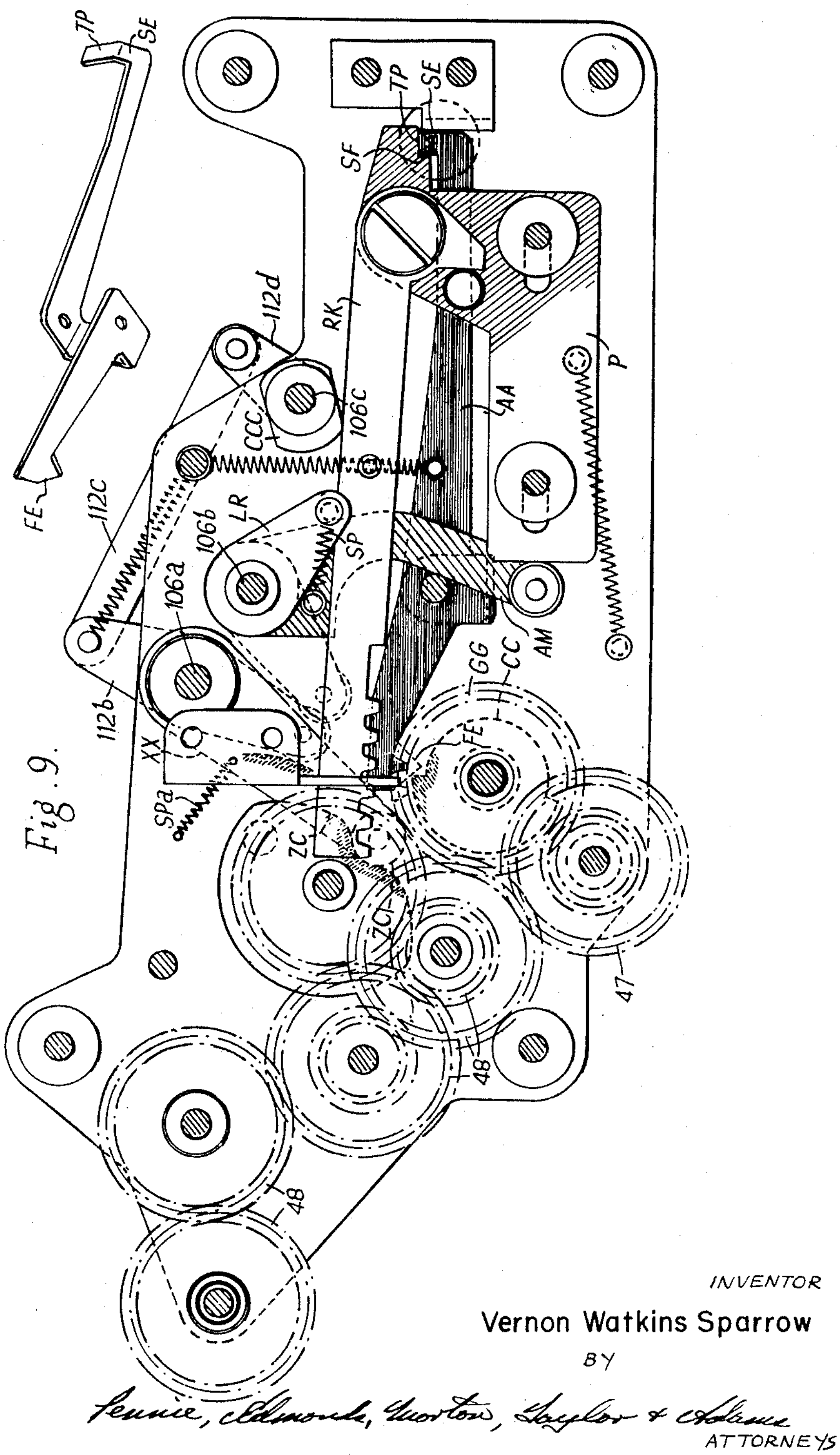
Figure 10:
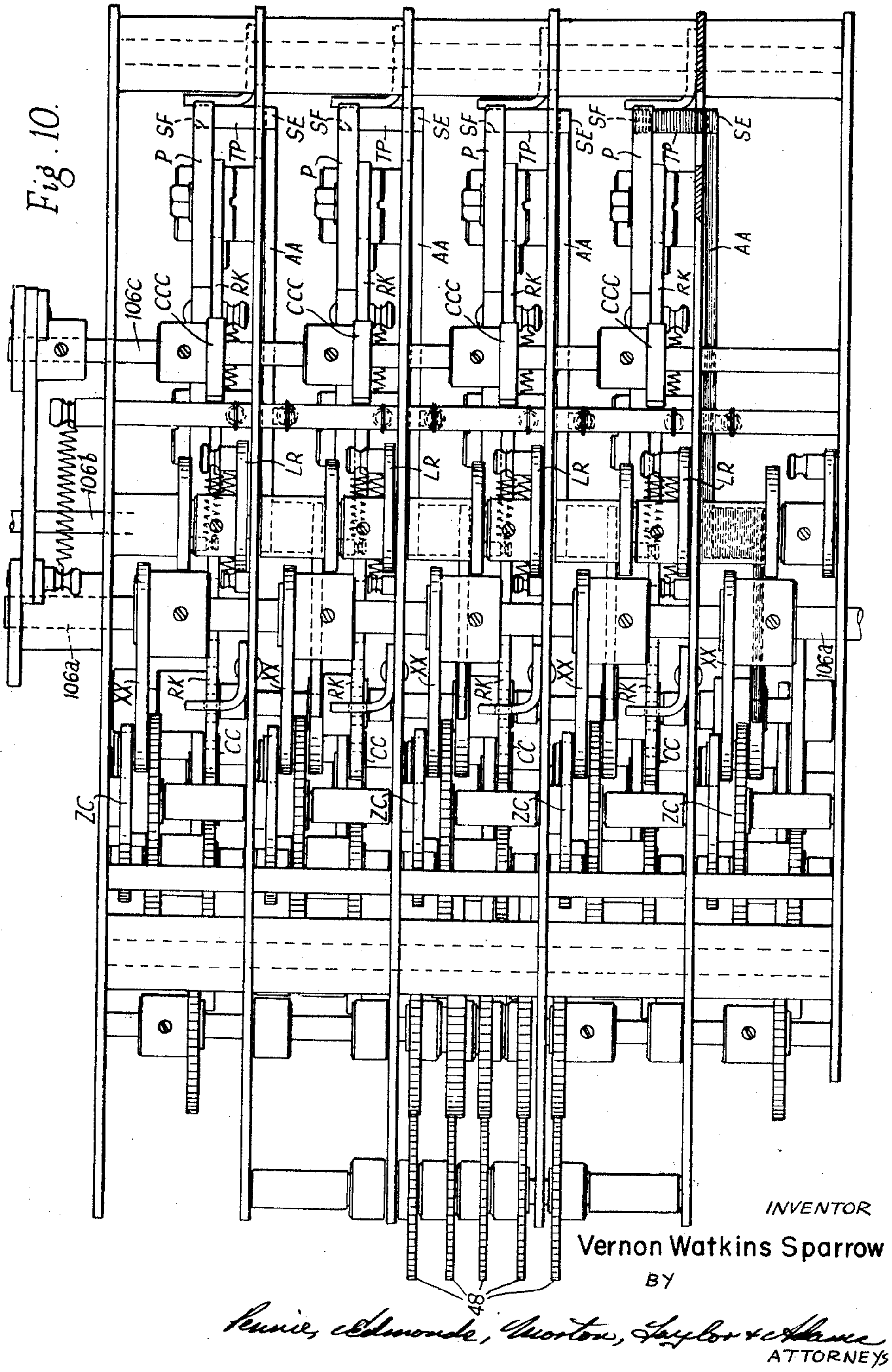
Figure 11:
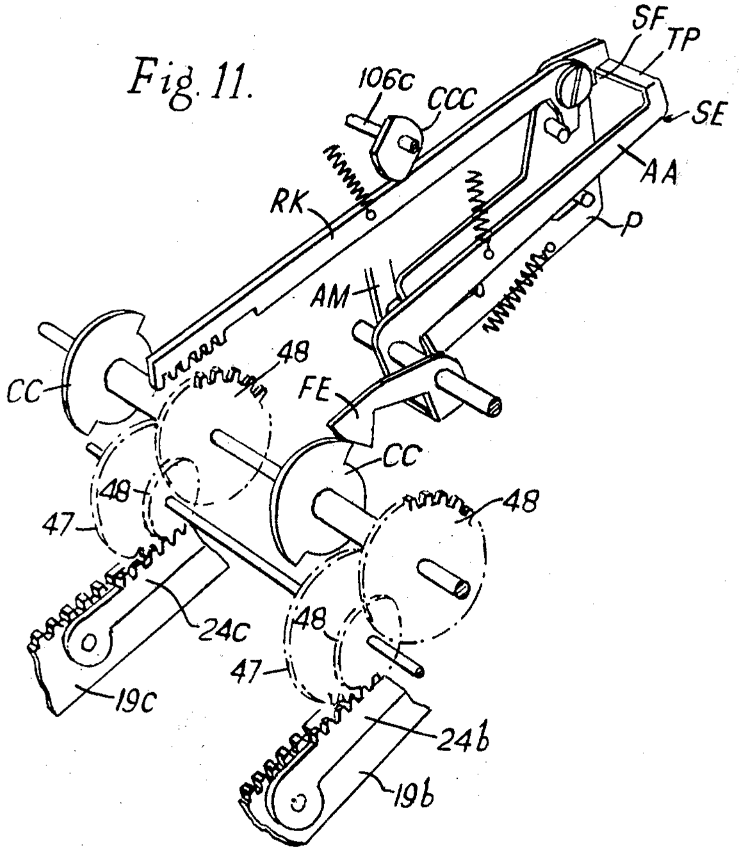
Figure 12:
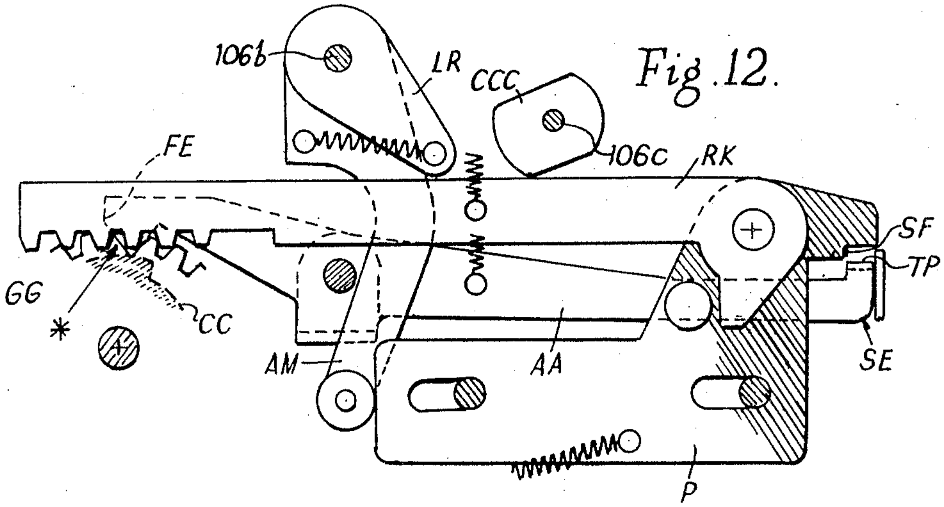
Figure 13:
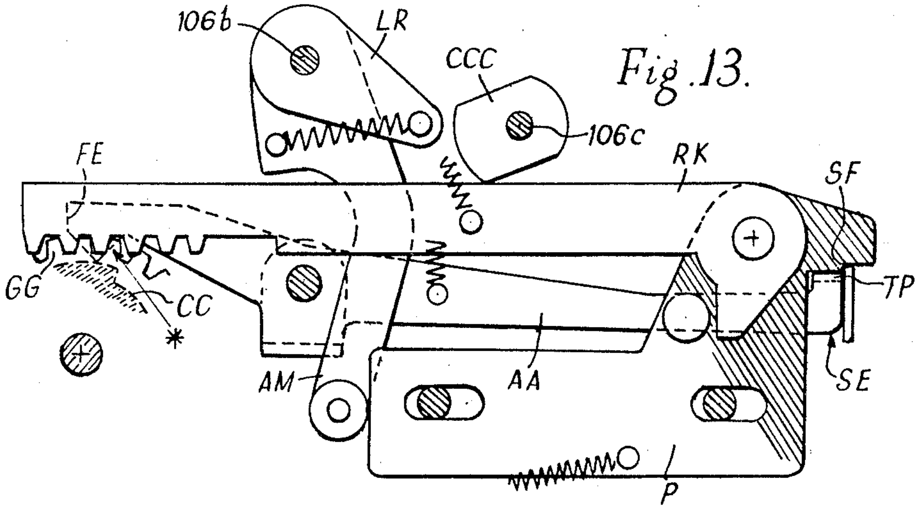
Figure 14:
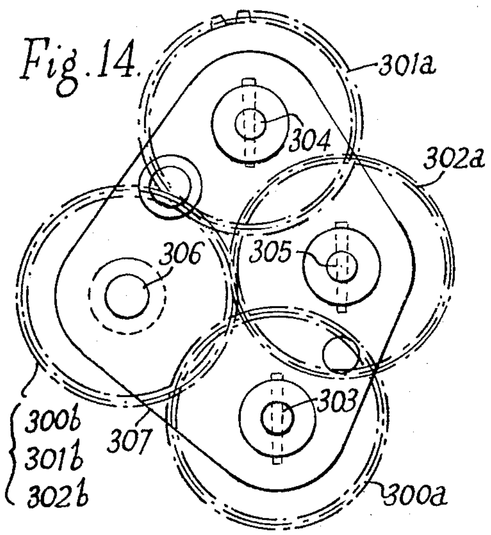
Figure 15:
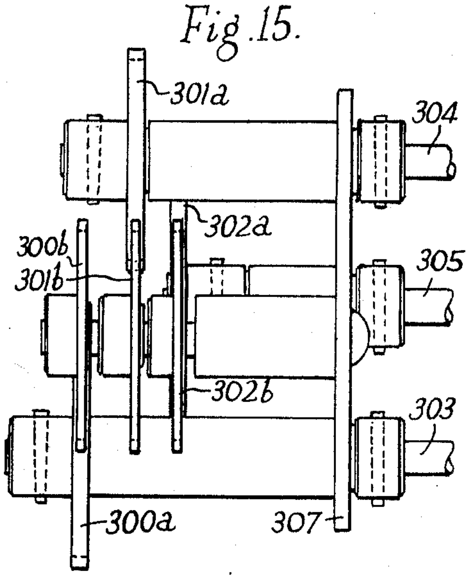
Figures 16, 17, 29:
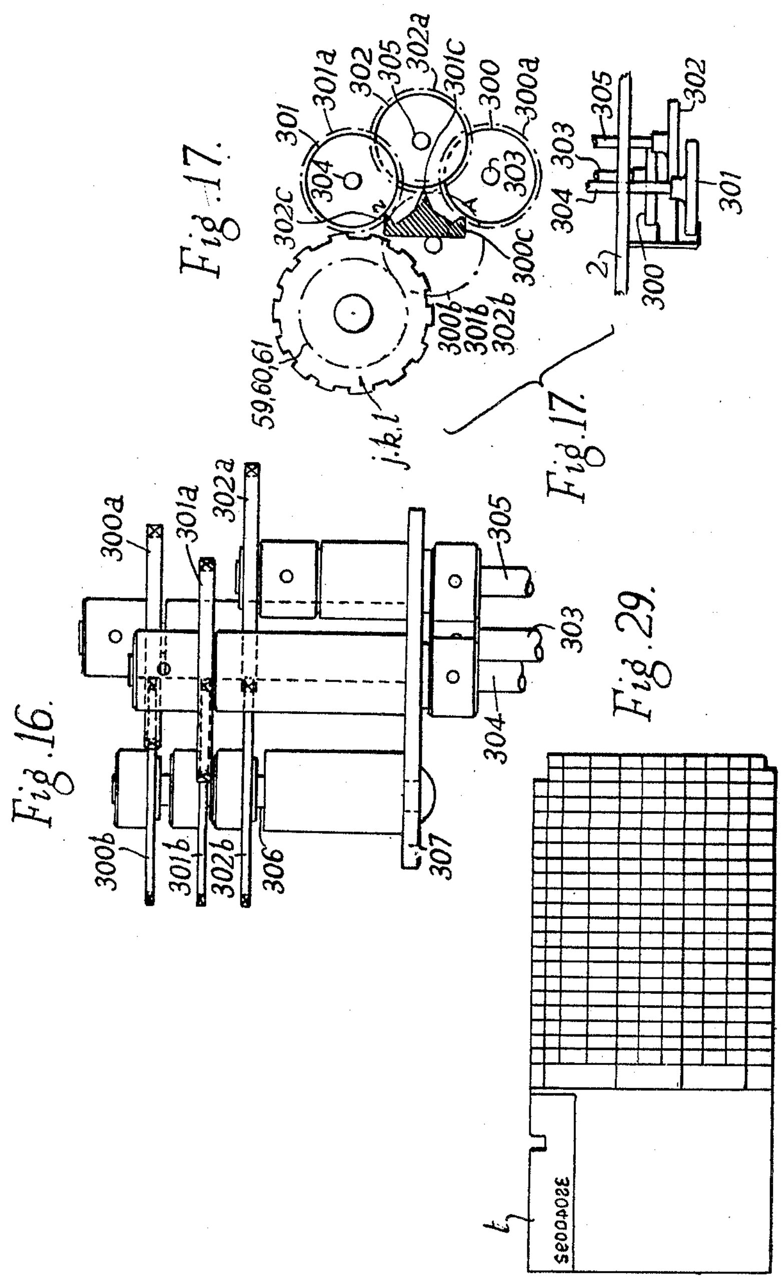
Figure 18:
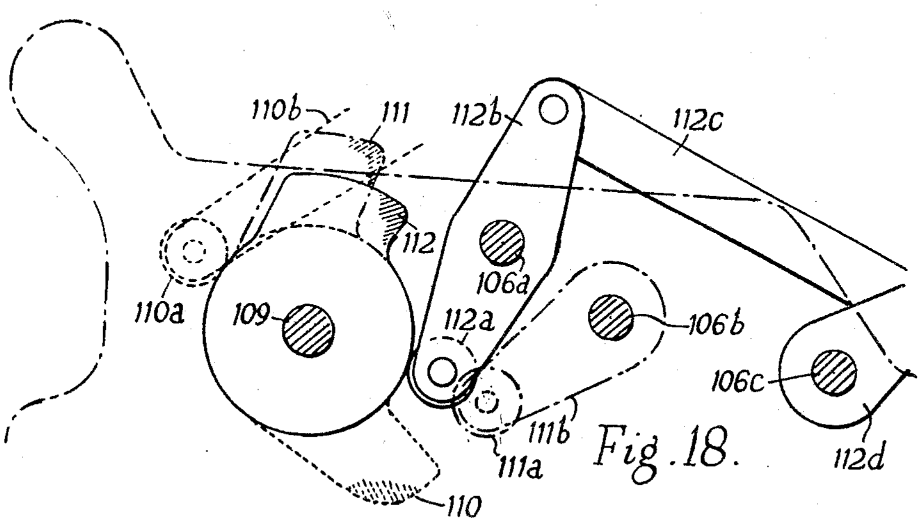
Figure 19:
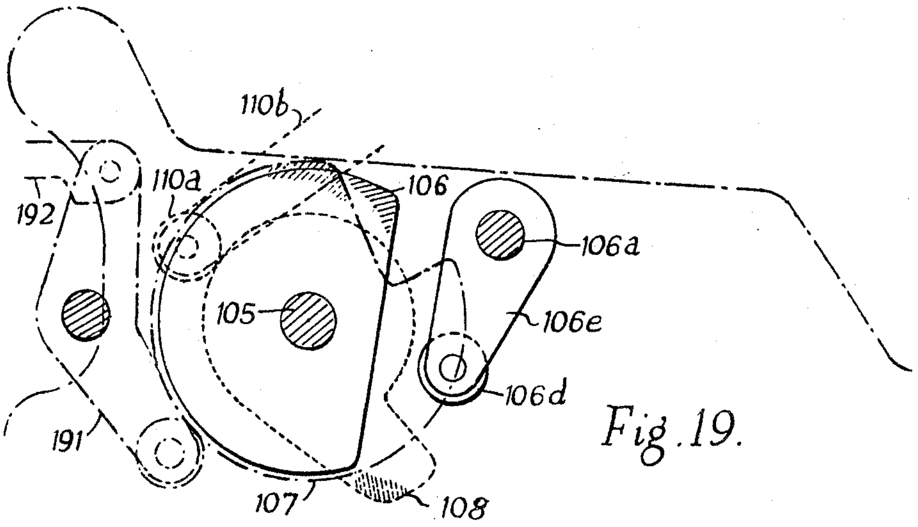
Figure 22:
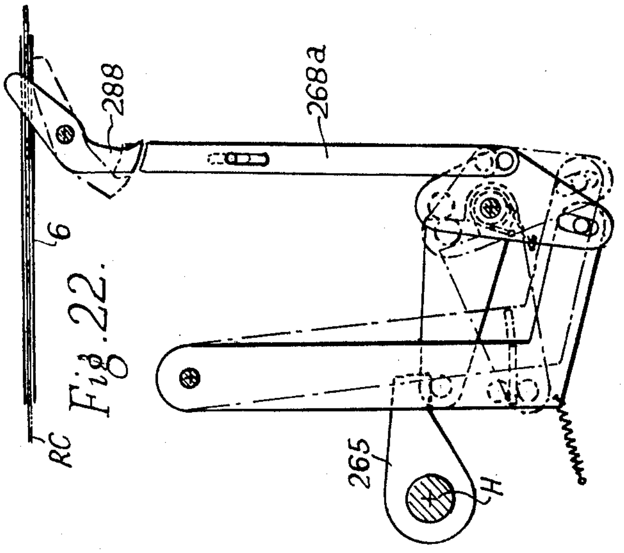
Figure 20:
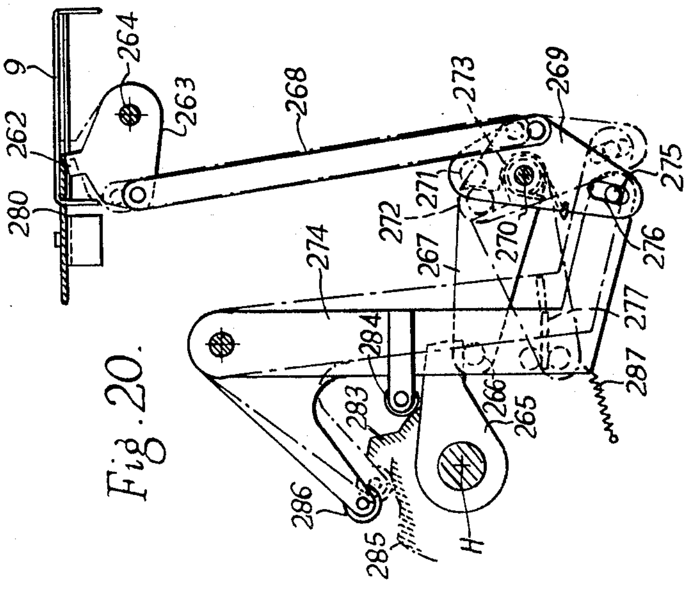
Figure 24:
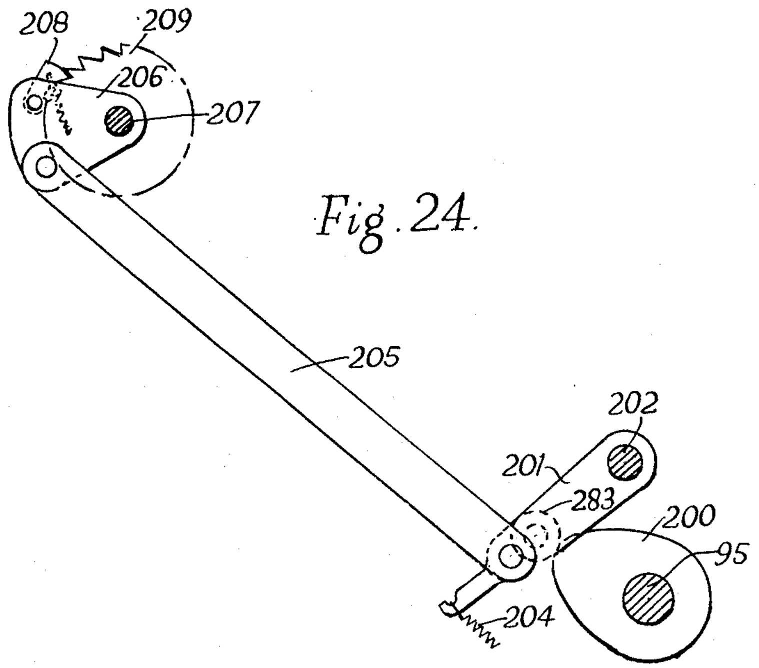
Figure 23:
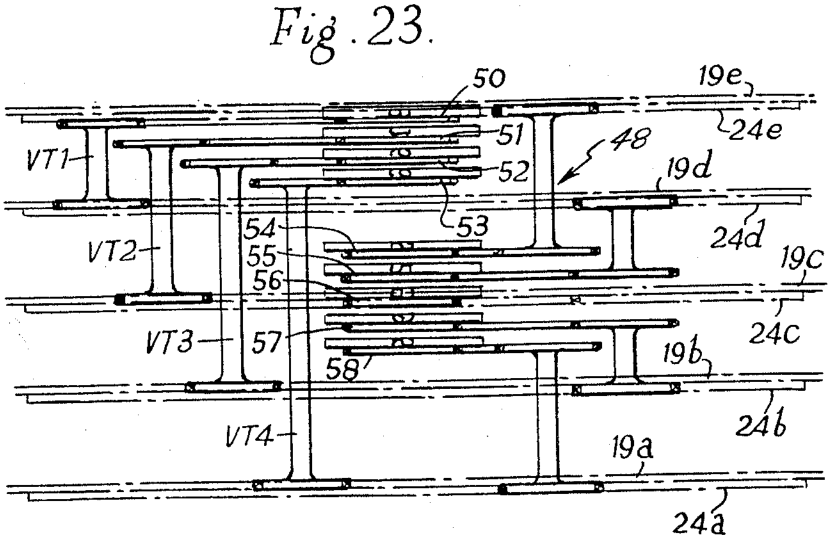
Figure 25:
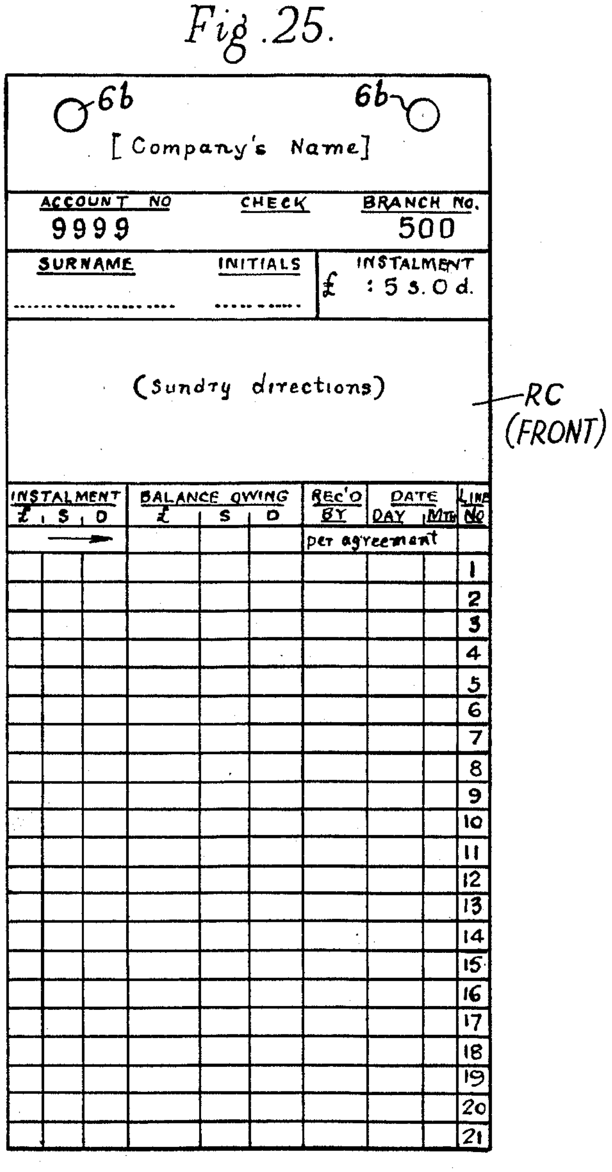

FIGURES 3*a*, 3*b* and 3*c* comprise together a side elevational view of the machine;

FIGURES 4*a*, 4*b* and 4*c* comprise together a plan view of the machine, the figure showing mainly the upper part of the machine;

FIGURES 5*a*, 5*b* and 5*c* comprise together a second plan view showing the lower part of the machine;

FIGURE 6 is an end view of the machine, it being understood that this figure and the preceding FIGURES 3*a*, *b* and *c* and 4*a*, *b* and *c* are largely schematic views designed more to illustrate the principles of operation of the machine than the constructional details thereof;

FIGURE 7 is an enlarged side elevational view of the validating unit of the machine;

FIGURE 8 is a corresponding plan view of the validating unit;

FIGURE 9 is an enlarged side elevational view of the subtraction unit of the machine;

FIGURE 10 is a corresponding plan view of the subtraction unit;

FIGURE 11 is a diagrammatic perspective view of part of the subtraction unit, illustrating the operation thereof as hereinafter more particularly described;

FIGURES 12 and 13 are fragmentary elevational views of the subtraction unit, further illustrating the operation thereof;

FIGURES 14, 15 and 16 are respectively a side elevation, end elevation and plan view of a date type wheel setting unit incorporated in the machine;

FIGURE 17 is a fragmentary side elevational view showing the means provided for manually operating the date type wheel setting unit;

FIGURE 18 is a fragmentary side elevational view showing certain cams, hereinafter identified and particularly described, through which the manual drive from the operating handle of the machine is transmitted to certain parts of the subtraction unit and also to the percussion members of the printing mechanism of the machine;

FIGURE 19 is a similar view showing other cams through which said manual drive is transmitted to certain other parts of the subtraction unit, to said percussion elements (the drive to these elements being duplicated in the machine, on respectively opposite sides thereof) and to a series of pawls which hold the type wheels of the machine in their printing positions;

FIGURE 20 is a fragmentary elevational view illustrating an interlock mechanism embodied in the machine effective to prevent operation of the printing cycle if the token is not in correct position in the machine;

FIGURE 21 is a plan view of the upper part of this mechanism;

FIGURE 22 is a fragmentary elevational view illustrating an interlock mechanism rendering it impossible to perform the printing cycle if the record card is not in position in the machine;

FIGURE 23 is a diagrammatic fragmentary plan view illustrating in a graphical manner the gear train arrangements employed in the validating and subtraction units of the machine;

FIGURE 24 is a fragmentary side elevational view illustrating a part of the drive connection between the operating handle of the machine and the feed means for the two tally rolls and the interleaved carbon strip;

FIGURE 25 illustrates a typical record card for use in the machine, the card being preprinted back and front for the reception of the data to be recorded on it and being designed for folding twice to fit snugly into the wallet portion of the wallet-token unit hereinbefore referred to.

Figure 26:
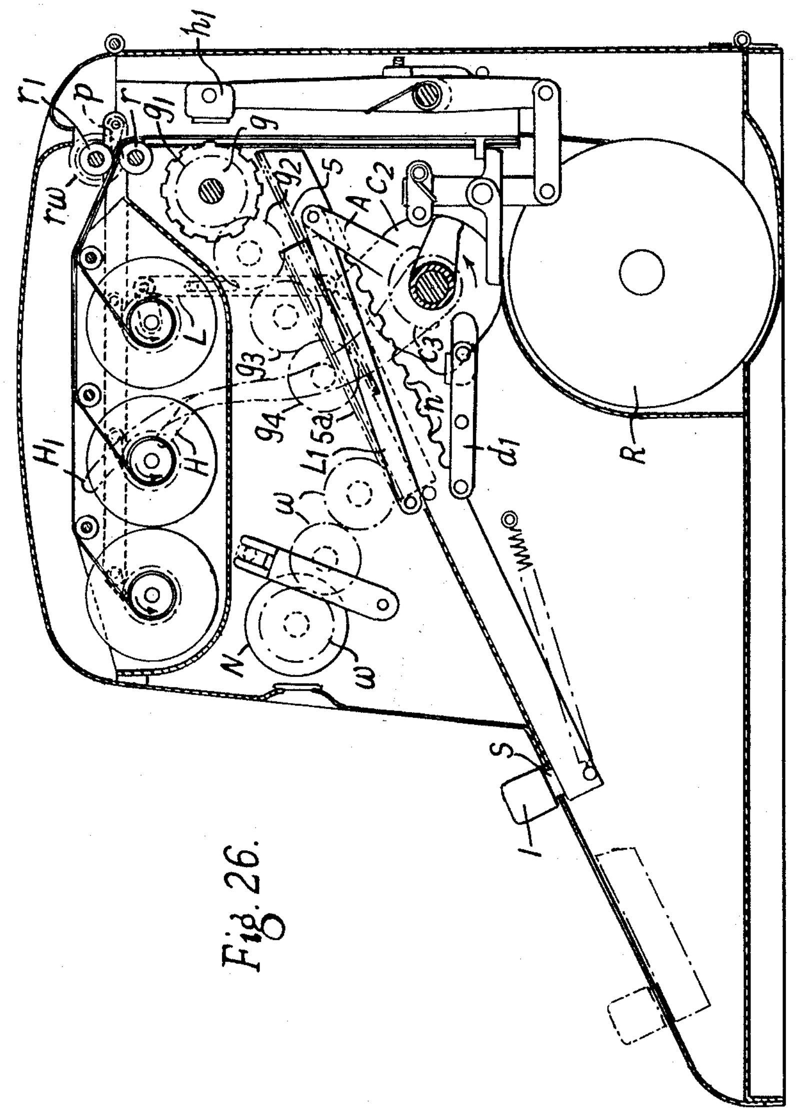
Figure 27:
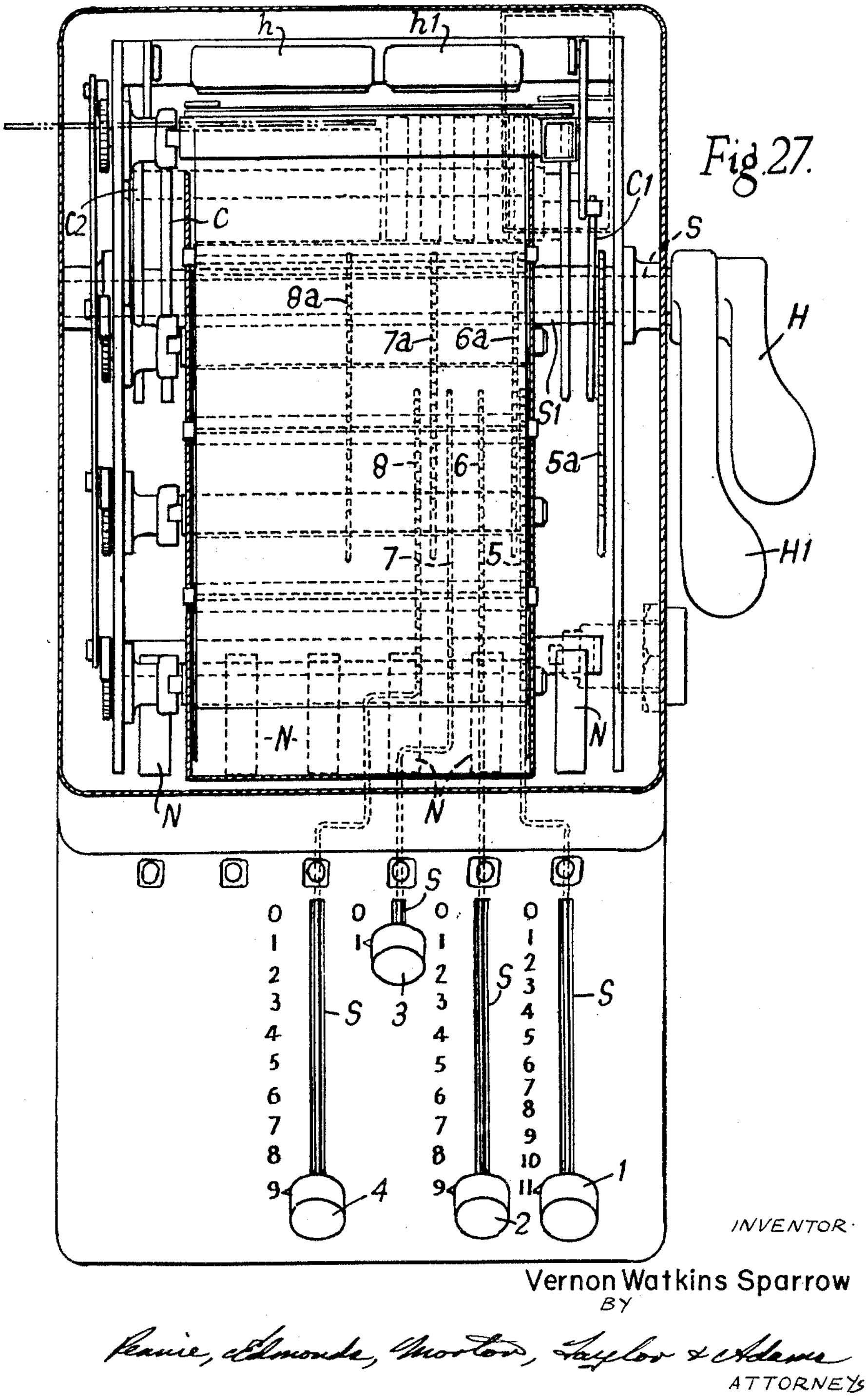
Figure 28:
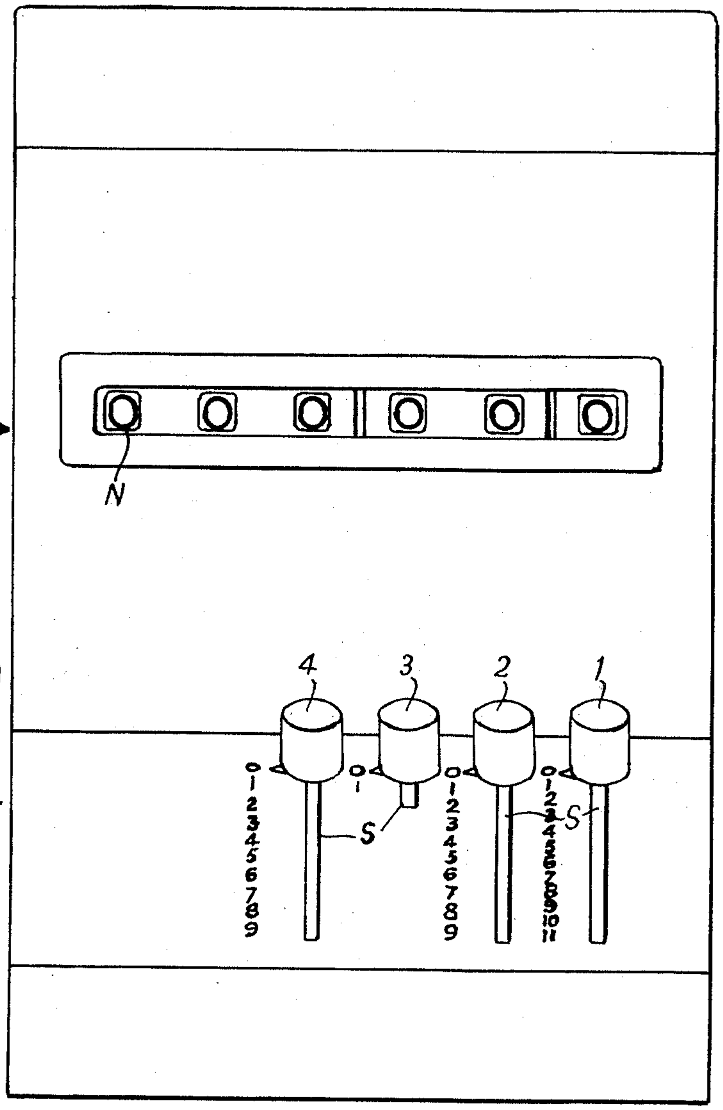
Figure 28A:
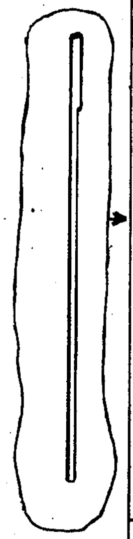

FIGURES 26 to 29 illustrate a further embodiment of the invention, FIGURE 26 being a side elevation of the machine, FIGURE 27 a corresponding plan view, FIGURE 28 an end view of the machine, FIGURE 28*a* a fragmentary side elevation of the machine illustrating a detail later described, and FIGURE 29 a view of a typical record card as used in the machine.

Diagram A illustrates two typical operating sequences for the subtraction unit of the machine.

Figure 1:
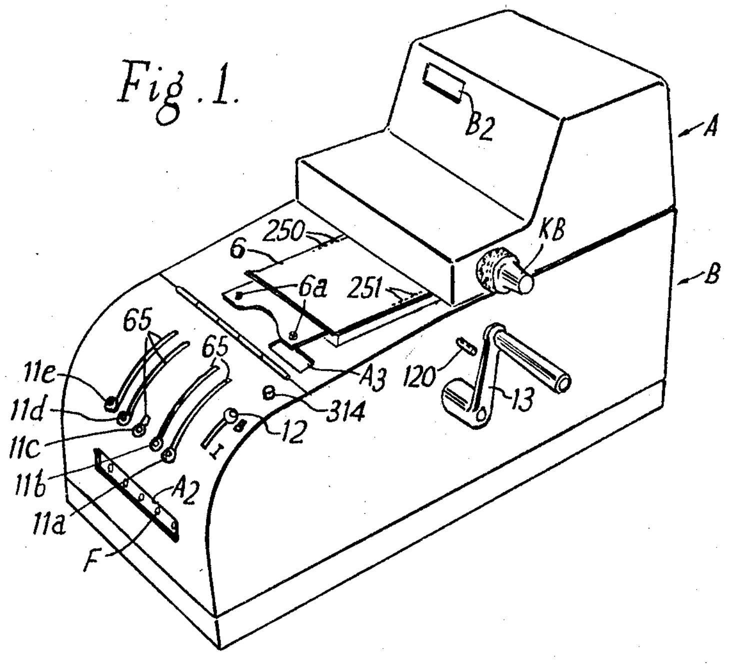
FIGURE 1 is a perspective external view of the machine, the latter being of the single operating handle design hereinbefore visualised.
Figure 2:
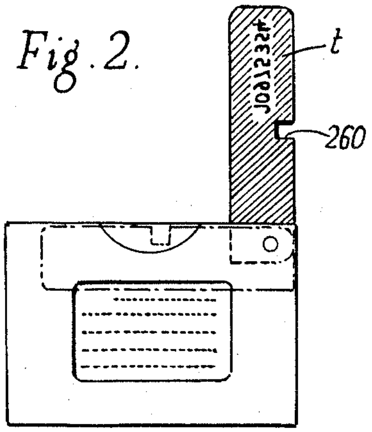
FIGURE 2 is a view of the wallet-token unit which is used in the machine.

The machine shown in FIGURES 1, 3 and 4 and the various detailed views associated therewith comprises two units, an upper unit generally marked A in FIGURE 1 and a lower unit generally marked B in that figure. The upper unit is detachably mounted upon the lower unit in such a manner as to be readily removable therefrom to give access to the parts located in the lower unit.

The upper unit A contains the following elements:

(1) The first and second percussion means of the machine as hereinbefore referred to, these percussion means taking the form of pivotal hammers marked 1 in FIGURE 3*b* and 1*a*, 1*b* . . . 1*t* in FIGURES 4*c* and 6.

(2) The tally roll carrier reel 2 from which the two tally rolls 3, 4 interleaved with a strip of carbon paper 5 as hereinbefore described are drawn past the printing position, generally designated C (see FIGURE 3*b*).

(3) The record card carrier 6 and its setting mechanism 7.

The lower unit B contains the following elements:

(1) Type wheels, marked 8 in FIGURES 3*b* and *c*, *a*, *b* . . . *l* in FIGURES 4*c* and 6.

(2) A token carrier 9 wherein the token which is used in the operation of the machine is inserted into printing position preparatory to the printing operation.

(3) A manual keyboard 10 (FIGURE 3*a*), consisting of five type setting keys marked 11 in FIGURE 3*a* and 11*a*, 11*b*, 11*c*, 11*d*, 11*e* in FIGURE 5*a*.

(4) Operative connections between the type setting keys and the type wheels which are set to printing positions by these keys. These connections include, as hereinafter more particularly described, (*a*) the validating unit of the machine, generally designated D, and certain elements of the subtraction unit of the machine, generally designated E (FIGURE 3*c*).

(5) A transfer lever 12 (FIGURE 3*a*) which is operated in the course of setting the type wheels to printing position by means of the type setting keys.

(6) The operating handle of the machine, designated 13 (FIGURE 6), and its drive connections to the parts of the machine which are operated by this handle. These parts include the printed hammers, certain elements hereinafter identified of the subtraction unit E and feeding means for the two tally rolls and the interleaved carbon strip, the two tally rolls and the carbon strip being drawn from the supply thereof in the upper unit A through a fixed increment or distance per cycle of operation of the machine.

The lower unit B also includes the various interlock mechanisms of the machine. These will be described later.

As will be seen from FIGURE 4*a*, there are twenty hammers 1*a*, 1*b* etc. associated in four groups of I, II, III, IV, and twelve type wheels *a*, *b* etc. associated in three groups thereof I, II and III.

The eight hammers of group I are used in conjunction with the token (in inserted position in the token carrier 9) to print the customer's account number, and also any data associated therewith as hereintofore identified, on the two tally rolls.

The four hammers of group II are used in conjunction with the four type wheels of group I to print the instalment value on the two tally rolls and at the same time on the record card (in inserted position in the record card carrier 6).

The five hammers of group III are used in conjunction with the five type wheels of group II to print the new balance amount on the record card.

Finally, the three hammers of group IV are used in conjunction with the three type wheels of group III to print the date of the instalment on the record card.

It will be understood, therefore, that the type wheels which are set to printing position by upward or downward movement of the keys 11 of the keyboard of the machine are those of groups I and II, the type wheels of group III being set by the manually operated setting mechanism illustrated in FIGURES 14, 15 and 16.

The lower unit B (see FIGURES 5*a*, *b*, *c*) comprises a rigid framework consisting of two main side frames 14 and 15 held in fixed relation to one another transversely of the machine by a number of cross members 16. The rigid framework is mounted upon a base plate 17 which takes the entire weight of the machine.

Mounted upon said rigid framework are a number of inner frames 18 disposed at equal distances apart transversely of the machine. As shown, there are six of these inner frames defining between them five working spaces generally marked *a*, *b*, *c*, *d* and *e*.

Each of the working spaces *a*, *b*, *c*, *d* and *e* contains the following elements, including among the parts forming the operative connections aforesaid between the keys 11 and the type wheels of groups I and II thereof:

(1) A main rack bar, marked 19 in FIGURE 3*b*, and 19*a*, 19*b*, 19*c*, 19*d* and 19*e* in FIGURES 4*a* and *c* and 5*a* and *c*. This rack bar extends longitudinally of the machine and is mounted upon a pair of cross members 20, 21 so as to have a freedom for reciprocatory sliding movement relatively thereto, longitudinally of the machine. The cross members 20, 21 extend through cooperating slots 22, 23 in the rack bar.

(2) A secondary rack bar, marked 24 in FIGURE 3*b* and 24*a*, 24*b*, 24*c*, 24*d* and 24*e* in FIGURES 4*c* and 5*c*. This rack bar is pivoted to the corresponding main rack bar at 25 (FIGURE 3*b*) so as to have a freedom for upward and downward movement relatively thereto under the control of parts hereinafter identified.

(3) A bell crank lever, marked 26 in FIGURE 3*a* and 26*a*, 26*b*, 26*c*, 26*d* and 26*e* in FIGURE 5*a*. This lever is pivoted at 27 to swing in a vertical plane. Its longer arm 28 carries the type setting key of the machine corresponding to the working space.

(4) A second bell crank lever, marked 29 in FIGURE 3*b* and 29*a*, 29*b*, 29*c*, 29*d* and 29*e* in FIGURE 5*a*. This lever is pivoted at 30 to swing in a vertical plane and is articulated at the upper end of its longer arm 31 to the main rack bar in such a manner as to be capable of reciprocating the main rack bar and therewith the corresponding secondary rack bar as the lever oscillates; for this purpose the said upper end of the longer arm 31 of the lever is formed with a slot 32 engaging a pin 33 on the main rack bar.

(5) A link, marked 34 in FIGURE 3*a*, 34*b*, 34*c*, 34*d*, and 34*e* in FIGURE 5*a*, pivotally connected at the forward end thereof to the free extremity of the upwardly extending shorter arm 35 of the lever 26*a* or 26*b* etc. and at the rear end to the free extremity of the upwardly extending shorter arm 36 of the lever 29*a* or 29*b*, etc.

Upward and downward movement of any of the keys 11*a*, 11*b* etc. therefore produces rearward (to the right in FIGURE 3) and forward (to the left in FIGURE 3) movement of the corresponding rack bars 19*a* or 19*b* etc. and 24*a* or 24*b*, etc.

As shown, each of the main rack bars carries three sets of rack teeth, designated respectively 37 (FIGURE 3*b*), 38 and 39.

Set 37 meshes continuously, therefore, in all longitudinal positions of the rack bar, with a toothed wheel 40 constituting the first (driving) wheel of a train of toothed wheels, generally marked 41 in FIGURE 3*b*, incorporated in the validating unit D.

Set 38 meshes, during a portion only (later identified) of the forward (leftward in FIGURE 3) stroke of reciprocation of the rack bar, with the first wheel 42 of a train of toothed wheels, generally marked 43 in FIGURE 3*a*, in drive transmitting relation to a visible totals register. This register is designated F and may conveniently be based, as regards principles of operation, on the register mechanism which is used in the "Sumlock" calculator.

Set 39 meshes continuously with the first (driving) wheel 44 of an associated train of toothed wheels, generally marked 45 in FIGURE 3*a*, in driving relation to a series of numeral wheels NW which are advanced or retracted in unison with the movements of the type setting keys.

Each of the secondary rack bars 24 carries a single set of rack teeth 46 (FIGURE 3*c*) which, when the rack bar is in the raised (effective) position, mesh with the first wheel 47 of a train of toothed wheels, generally marked 48 in FIGURE 3*c*, incorporated in the subtraction unit E.

There are four wheel trains 41 in the validating unit D and five wheel trains 48 in the subtraction unit E.

Each of the type wheels *a* through *l* (see FIGURES 4*b* and *c*) of the machine, which are coaxial and revolubly mounted on a common carrier shaft CS extending completely across the machine in fixed relation thereto, is associated with a toothed wheel coaxial and fast with the type wheel. Thus the four type wheels *a*, *b*, *c* and *d* are associated with four such toothed wheels 50, 51, 52 and 53; the five type wheels *e*, *f*, *g*, *h* and *i* are associated with five such toothed wheels 54, 55, 56, 57 and 58, and the remaining type wheels *j*, *k* and *l* are associated with three such toothed wheels 59, 60 and 61.

As clearly illustrated in FIGURE 23, the four gear trains in the validating unit, which are represented symbolically at VT1, VT2, VT3 and VT4, are so arranged as to transmit the drive from the main rack bars 19*a*, 19*b*, 19*c* and 19*d* to the four toothed wheels 53, 52, 51 and 50 respectively. The same figure illustrates how the five wheel trains 48 in the subtraction unit are so arranged as to transmit the drive from the secondary rack bars 24*a*, 24*b*, 24*c*, 24*d* and 24*e* to the toothed wheels 58, 57, 56, 55 and 54 respectively.

The five type setting keys 11*a*, 11*b*, 11*c*, 11*d* and 11*e* are allocated respectively to the following money denominations: pence, shillings, ten shillings, pounds and tens of pounds. The five type wheels *i*, *h*, *g*, *f* and *e* are similarly allocated respectively to pence, shillings, ten shillings, pounds and tens of pounds. The four type wheels *d*, *c*, *b* and *a* are allocated respectively to pence, shillings, ten shillings and pounds.

It follows, therefore, that operation of any of the keys 11*a*, 11*b*, 11*c* or 11*d* results in the impartation of a setting movement of the corresponding type wheel *d*, *c*, *b* or *a*, the movement of the type wheel being in precise unison, both as regards rotational direction and also as regards extent of movement, with the movement of the operated key. The same applies as regards the type wheels *i*, *h*, *g*, *f* and *e*, it being assumed in this case that the secondary rack bars are in their effective (raised) positions. It should be remarked, however, that the instalment type wheels *d*, *c*, *b* and *a* are always in mesh, through the intervening wheel trains of the validating unit, with the four main rack bars 19*a*, 19*b*, 19*c* and 19*d*, whereas the balance type wheels *i*, *h*, *g*, *f* and *e* are only in mesh, through the intervening wheel trains of the subtraction unit, when the secondary rack bars are in their effective positions.

The arrangement is such that upward movement of the keys advances the type wheels (so that they record a higher value) and downward movement of the keys retracts the type wheels (so that they record a lower value).

As will be seen from FIGURE 1, the stems of the type setting keys work in slots 65. There are four full-length slots through which the stems of keys 11*a*, 11*b*, 11*d* and 11*e* extend and one short-length slot through which the stem of the 10/-key 10*c* extends.

The secondary rack bars 24 of the machine are brought to the effective (raised) position by thrust from the transfer lever 12, transmitted against the opposing pull of a returning spring 66 (FIGURE 3*c*), through a linkage consisting of a double-armed lever 67 (FIGURE 3*a*) pivoted at 68 so as to have a freedom for rocking movement in a vertical plane; a link 69 connecting the lower end of the shorter (downwardly extending) arm of the lever 67; a second link 70 (FIGURE 3*b*) connecting the upper end of the longer (upwardly extending) arm of the lever 67 to the free end of a downwardly directed lever arm 71 (FIGURES 3*c* and 5*c*) fixed to the outer end of a rock shaft 72 extending across the machine and carrying in fast relation to the shaft five lever arms 73, 74, 75, 76 and 77 (FIGURE 5*c*) having at the free end thereof rollers 78, 79, 80, 81 and 82 which engage respectively with the undersides of the secondary rack bars 24*a*, 24*b*, 24*c*, 24*d* and 24*e* so as to lift these bars in consequence of clockwise movement of the rock shaft 72.

As shown in FIGURE 3*a*, the transfer lever 12 is operable between two limit positions determined respectively by an upper stop 85 and a lower stop 86. The lever occupies the upper position when the machine is at rest, and therefore at the commencement of a cycle of operation of the machine.

The totals register unit F occupies the lower position (in which lower position it appears in FIGURE 3), in which it is out of mesh (driving connection) with the rack teeth 38 on the main rack bars, when the machine is at rest, and therefore at the commencement of a cycle of operation of the machine. The unit is raised off a cross bar 90, which acts as a stop relative to the unit, determining its lowered position in the machine, into meshing position with the rack teeth 38 by anti-clockwise movement of a pair of double-armed levers 91, 92 fixed to opposite ends respectively of a rock shaft 93 extending across the machine framework (FIGURE 4*a*), the lever 91 being operated to and from its effective (unit lifting) position by thrust from a cam 94 (FIGURES 3*c* and 5*c*) fast with a main drive shaft 95, said thrust being transmitted to the lever by way of a link 96 (FIGURE 3*b*) pivotally connected at the forward end thereof to the lever 92 and at the rear end of the link to a lever arm 97 revolubly mounted on a carrier shaft 98, also extending across the machine framework.

As shown in FIGURE 3*b*, a cam 98*a* on main driving shaft 95 operates on a roller 98*b* carried on a rod 98*c* connected at the two ends thereof to a pair of levers 98*d*, 98*d* pivoted at 98*e* to the rigid framework of the machine to swing in vertical planes.

These levers 98*d*, 98*d* are pivotally connected at the upper (free) end thereof to a pair of links 98*f*, 98*f*, which in turn are pivotally connected to a pair of levers 98*g*, 98*g*, pivoted at 98*h* to the rigid framework of the machine to swing in vertical planes.

Levers 98*g*, 98*g* are pivotally connected at the lower (free) end thereof to a pair of links 98*i*, 98*i*, which in turn are connected to opposite ends respectively of a coupling rod 98*j*, extending across the machine and slidable along slots 98*k* provided to accommodate the movement of the rod in the frames 18.

Through the intermediary of these parts of the rack bars are moved back to a position beyond the zero position (i.e., the machine-at-rest position at which the type wheels which are operated through the rack bars are standing at their "zero" recording positions) by a distance which is sufficient to impart a slight over-feed into the totals register FR.

The main drive shaft 95 is driven from the shaft of the machine operating handle 13, the drive being transmitted through a first gear wheel 100 fast with the shaft H, a second gear wheel 101 meshing with the wheel 100 and a third gear wheel 102 meshing with the wheel 101, the wheel 102 being fast with the shaft 95 and meshing with a fourth gear wheel 103 meshing in turn with a fifth gear wheel 104 fast with a stub shaft 105 carrying three cams 106, 107 and 108 in fast relation to the shaft.

There is a similar stub shaft 109 on the opposite side of the machine carrying three further cams 110, 111 and 112 in fast relation to the shaft. This shaft 109 is also driven from the shaft 95 in unison with, and in the same direction as, the shaft 105, the drive being transmitted through a first gear wheel 113 fast with the shaft 95, a second gear wheel 114 meshing with the wheel 113 and coaxial with the wheel 103 and a third gear wheel 115 meshing with the wheel 114 and fast with the shaft 109.

The two stub shafts 105, 109 are supported in bearings therefor incorporated in the rigid framework of the machine.

The operating handle 13 is, in the rest position of the machine, prevented from being turned to perform a printing cycle in the use of the machine by a release pin 120 (FIGURE 1) projecting into its path from the rigid framework of the machine and adapted to be pushed into a non-intercepting position relatively to the handle by the thumb or a finger of the hand of the operator of the machine in placed position on the handle.

Fast with the main drive shaft 95 are three further cams 123, 124 and 125.

Cam 123 operates a stirrup lever SL effective, when in operated position, to lock the transfer lever 12 in the operated (lowered) position. It accomplishes this by engaging in a notch 126 provided to receive it in the lower edge of link 70. The stirrup lever is pivoted at 128 to swing in a vertical plane and it is fast with an arm 129 in follower relation to the cam 123.

Cam 124 operates a rack locking mechanism effective to lock the main rack bars, and therewith the secondary rack bars, in their operated (key set) positions during the printing operation. This mechanism consists of a series of bell crank levers 130, 131, 132, 133 and 134 located respectively within the five "working spaces" *e*, *d*, *c*, *b* and *a* hereinbefore referred to. These levers are pivotally mounted upon the associated rack bars 19*a*, 19*b*, 19*c*, 19*d* and 19*e* and they carry in each case, at the free end of the horizontal arm of the lever, a roller 135 which engages selectively, according to the longitudinal position of the associated rack bar, in one of a series of equally spaced semi-circular notches 136 provided to receive these rollers in the lower edge of the rack bar (FIGURE 3*b*). The levers 130, 131, 132, 133 and 134 are spring urged into engaging position with respect to the notches by loading springs 137. The rollers 135 can therefore ride out of engagement with the notches as the rack bars are operated (by the type wheel setting keys of the machine). The rack bars having been brought to their selected positions, they are automatically locked therein by the intercepting action of a series of locking levers 140, 141, 142, 143 and 144. These levers are fast with the shaft 98 so as to be raised and lowered to and from effective position, in which position they appear in chain line in FIGURE 3, the ineffective (lowered) position being the position in which they appear in full lines in that figure, in consequence of a partial rotation of the shaft 98. Such partial rotation is produced by cam 124 operating through a cam roller 145 on an arm 146 fast with the shaft 98. The arm 146 is biassed to return the locking levers 140, 141, 142, 143, 144 to their ineffective (lowered) positions. They all move in unison, as will be understood.

Cam 125 operates a stirrup 150 fast with a shaft 151 extending across the machine framework and effective upon operation, in the anti-clockwise direction in FIGURE 3, to disengage the levers 130, 131, 132, 133, 134 and 135 from the associated rack bars, thereby permitting free movement of the bars. The cam transmits its thrust to the shaft 151 through a follower roller 152 on an arm 153 fast with the shaft 151.

Referring now to FIGURES 7 and 8, which illustrate in detail the construction of the instalment unit D of the machine, it will be seen that the four wheel trains of the unit are provided by an arrangement of wheels carried upon five shafts A, B, C, D and E. Shaft D carries four wheels 1, 2, 3 and 4. These correspond to the four wheels designated 40 in FIGURE 3*b* and they mesh respectively with the four rack bars 19*a*, 19*b*, 19*c* and 19*d*. The four wheels 5, 6, 7 and 8 on shaft E mesh respectively with the four toothed wheels 53, 52, 51 and 50 associated with the four instalment type wheels *d*, *c*, *b* and *a*. In order that the arrangement of the wheels shall provide the effect illustrated symbolically in FIGURE 23, the wheels forming the train leading from wheel 1 to wheel 5 rotate freely on the shafts D, C, B and E but are pinned to shaft A; the wheels forming the train leading from wheel 2 to wheel 6 rotate freely on the shafts A, C and D but are pinned to shaft B; the wheels forming the train leading from wheel 3 to wheel 7 rotate freely on shafts A, B, D and E but are pinned to shaft C; and the wheels forming the train leading from wheel 4 to wheel 8 rotate freely on shafts A, B, C and E but are pinned to shaft D.

The subtraction unit, as illustrated in detail in FIGURES 9 and 10, consists of five identical sets of mechanisms (save that in the case of one of these sets some of the elements of the set are omitted) allocated respectively to pence units, shillings units, tens of shillings units, pounds units and tens of pounds units. The five sets are therefore respectively associated in the design and working of the machine with the five type wheels *e*, *f*, *g*, *h*, *i* which print the new balance.

In the operation of the machine the value of the old balance is selected, thus positioning the main racks of the machine.

The transfer lever 12 is then moved to the lowered ("Instalment") position, thus moving the secondary racks into engagement with the wheels 47 (FIGURE 3).

The type setting keys are then moved to the positions representing the value of the instalment (including zeros) and, depending on the direction of this movement, so will a cam CC in each section of the subtraction unit position itself.

If the main rack moves in the forward (leftward in FIGURE 3) direction, which direction of movement represents a subtraction of a lower figure than that previously set up to enter the old balance, cam CC will present its smaller diameter to feeler end FE of arm AA. Stop end SE of arm AA (which is of stirrup shape as illustrated in the small figure above FIGURE 9) will therefore remain in contact with stop face SF of plate P and thus prevent any movement of this plate when pressure to move it is applied by arm AM, such pressure being transmitted from lever LR fast with shaft 106*b* through spring SP. It is to be noted that racks RK pivoted on plates P are moved into mesh with gears GG (which correspond to certain of the wheels of the wheel trans designated 48 in FIGURE 3, as inspection of that figure will show) by rotation of cams CCC fast with shaft 106*c*, all racks moving into mesh simultaneously.

If, however, the main rack bars move in the reverse direction (i.e. rearwardly of the machine) which direction of movement represents a subtraction of a higher figure from that previously set up by entry of the old balance, cam CC will present its larger diameter to feeler end FE of arm AA. Stop end SE of arm AA will, therefore, be retracted from stop face SF of plate P, so that when pressure is applied through arm AM, plate P will be capable of moving a certain distance. As rack RK has been brought into mesh with gear GG by pressure upon it of cam CCC, this movement of plate P will pull gear GG round a distance necessary to reduce the type wheel set figure by one digit through the intermediary of the remaining gears of the relative wheel train 48 (FIGURE 3).

Each section of the unit can be set independently of the remainder of the sections and any section may be so set that it influences the next higher (in digit figure value) section through the intermediary of the lever AA, which it will be seen has a tail portion TP extending into the next higher section so as to be capable of determining the condition of the rack RK of that section in the sense that if this rack is intercepted by the tail portion TP, the rack RK of said next higher section being then in the position in which the parts appear in FIGURE 9, the rack will not be free to move to the right (in FIGURE 9) under the thrust of the corresponding arm AM, and in consequence the position of the gear GG will remain unaltered; whereas if the rack is not intercepted by the tail portion TP, the rack RK of the said next higher section being then in the position in which the parts appear in FIGURE 12, the rack will be free to move to the right under said thrust and in consequence it will take up the retracted position in which is appears in FIGURE 13, thus moving the associated gear GG one digital movement backwards (in FIGURES 12 and 13).

It is to be noted that the secondary racks of the machine are released from mesh with the toothed wheels 47 (FIGURE 3) to allow movement of the plate P to occur as required, thus adjusting the type wheel positions in the manner described.

Subsequent to the release of the hammer for the printing stroke, cam 106 on stub shaft 105 frees shaft 106*a* (FIGURES 3, 4, 9 and 10) to enable it to be rotated, with consequent movement of the arms XX against the zeroising cams ZC through the intermediary of the rollers $ZC_1$ on these arms, under the pull of springs SP*a*, which are sufficiently powerful to rotate the complete gear train in each section, together with the associated type wheel.

FIGURES 18 and 19 illustrate respectively various cams on the two stub shafts 109 and 105.

Cam 110 on the left hand side of the machine (viewing the latter from the viewpoint of FIGURE 1) which operates the printing hammers through roller 110*a*, arm 110*b*, shaft 110*c*, levers 110*d* and pins 110*e* on levers 110*d*; cam 111 which operates the plates P of the subtraction unit through roller 111*a*, lever 111*b*, shaft 106*b*, levers LR, spring SP and arms AM (the last three items being located within the subtraction unit), and cam 112 which depresses the racks RK of the subtraction unit through roller 112*a*, lever 112*b*, link 112*c*, arm 112*d*, shaft 106*c* and cams CCC (subtraction unit), are all on stub shaft 109.

Cam 100 (on the right hand side of the machine), which also operates the printing hammers through roller 110*a*, arm 110*b*, and shaft 110*c*; cam 106 which operates the zeroising cams ZC of the subtraction unit and cam 108 which operates the type wheel locating pawls 190 (FIGURES 3 and 4) through lever 191, link 192, arm 193, shaft 194 and stirrup 195 against the pull of the loading spring 196, are all on shaft 105.

The hammers 1*a*, 1*b* . . . 1*t* are lifted in consequence of clockwise (in FIGURE 3) rotation of shaft 110*c* and levers 110*d* against the opposing pull of a loading spring 110*f*, the normal (machine at rest) position of the levers 110*d* being that shown in FIGURE 3, in which the levers are pulled by the spring 110*f* against a stationary but adjustable stop 110*g*, in which position of the levers the hammers are pulled upwardly against pins 110*e* on the levers 110*d* by light tension springs 110*h* anchored at the upper end thereof to pins 110*i* on the levers 110*d* and at the lower end to anchorages 110*j* on the hammers.

With this arrangement the hammers, upon release from their raised positions under the control of the cams 110 which have brought them to those positions, are pulled downwardly, through their printing stroke, by the springs 110*f* with considerable force, and owing to their permissive connection, through the light springs 110*h*, with the levers 110*b*, they are free to continue their downward stroke after the levers have been brought against the stop 110*g*, which it will be seen is common to all of the levers through the intermediary of a connecting bar 110*k* in rigid connection therewith, the further downward movement of the hammers enabling the latter to effect a definite percussive action in the printing operation, the hammers being returned to their machine at rest positions (against the pins 110*e*) by the light springs 110*h*.

The incremental feeding forward of the two tally rolls 3 and 4 and the interleaved carbon strip 5 from the composite supply roll RL is effected by drive from a cam 200 (see FIGURE 24) fast with main drive shaft 95, a lever 201 in follower relation to cam 200, said lever being oscillatable about a fixed axis 202 and being maintained in engagement with the cam 200, through the intermediary of a roller 203 on the lever, by the pull of a tension spring 204; a link 205 connecting the lever 201 with a pawl carrier 206 pivoted at 207 for oscillatory movement in a vertical plane; a driving pawl 208 on the pawl carrier 206 (see FIGURE 3); a ratchet wheel 209 whose axis is coincident with the axis of movement 207 of the pawl carrier; a toothed wheel 210 coaxial with and in fast relation to the ratchet wheel 209; a second toothed wheel 211 meshing with wheel 210 and coaxial with and in fast relation to a draw roller 213, the roller 213 co-operating with a pressure roller 214 to draw tally roll 4 a step at a time under drive from main drive shaft 95, leading it downwardly within the casing 215 to a guide roller 216 which in turn leads it to a take-up reel 217 near the forward end of the casing 215, which is driven at precisely the same speed as draw roller 213 through a train of toothed wheels driven by toothed wheel 210 and comprising wheels 218, 219, 220, 221, 222 and 223.

Tally roll 3 is guided over draw roller 213 and then over a guide roll 224 which guides it to a second take-up wheel 225 which similarly is driven at the same speed as draw roller 213 through the intermediary of wheels 210, 218, 219, 220 and 221 of the aforesaid wheel train.

Carbon strip 5 is guided from draw roller 213 over guide roll 224 which leads it to a third take-up reel 226 which again is driven at the same speed as draw roller 213 through the intermediary of wheels 210, 218 and 219.

In this way it is ensured that a consistent amount of tally roll shall be fed to suit the electronic reading machine which analyzes the recordings at the Head Office.

The ratchet wheel 209 is prevented from reverse movement by pawl 227.

The take-up reels 217, 225 and 226 are of the construction clearly shown in FIGURES 3 and 4 and they are driven from the associated toothed wheels 223, 221 and 219 through spring loaded friction drives 228 which serve to accommodate the changing rate of rewind, which varies, as will be understood, with the amount of strip wound onto the reel.

As shown, the centres 229 of the reels are spigoted in each case on carrier centres therefor 230, 231 formed with disc-shaped flanges 232, 233 against which the associated centre 229 abuts in the manner shown.

The centres 229 are placed in non-rotative engagement with the flanges 232, 233 by coupling pins 234 engaging in diametral notches 235 in the reel centres, the said pins 234 being carried on the carrier centres 230, 231.

Carrier centres 230 are of fixed position axially of the reel and are driven by the associated toothed wheels 223, 221, 219. Carrier centres 231 are axially displaceable, against the thrust of loading springs 236, to release the associated reel centres for removal from the machine to enable the used tally roll to be detached from the centre and the leading end of a fresh roll, previously threaded into position in the machine, to be attached to it, the centre being thereupon replaced in the machine. The centres 231 are so displaceable by means of axial displacement of knobs 231*b*.

The carbon strip which is used to print the new balance and the date of payment of the installment on the record card, which strip is marked 240 in FIGURE 3, is fed past the printing position in small incremental steps and the feeding mechanism may, of course, take any desired form. In the arrangement shown, which utilises an endless strip, the strip is drawn from a driven roller 241 from which it passes over guide rollers 242, 243, 244, 245, 246, 247, 248 and 249, and thence back onto roller 241, roller 249 being driven, by drive from the operating handle of the machine transmitted through any suitable form of operative connection (not shown), synchronously with, and at the same speed as, roller 247.

Figure 25A:
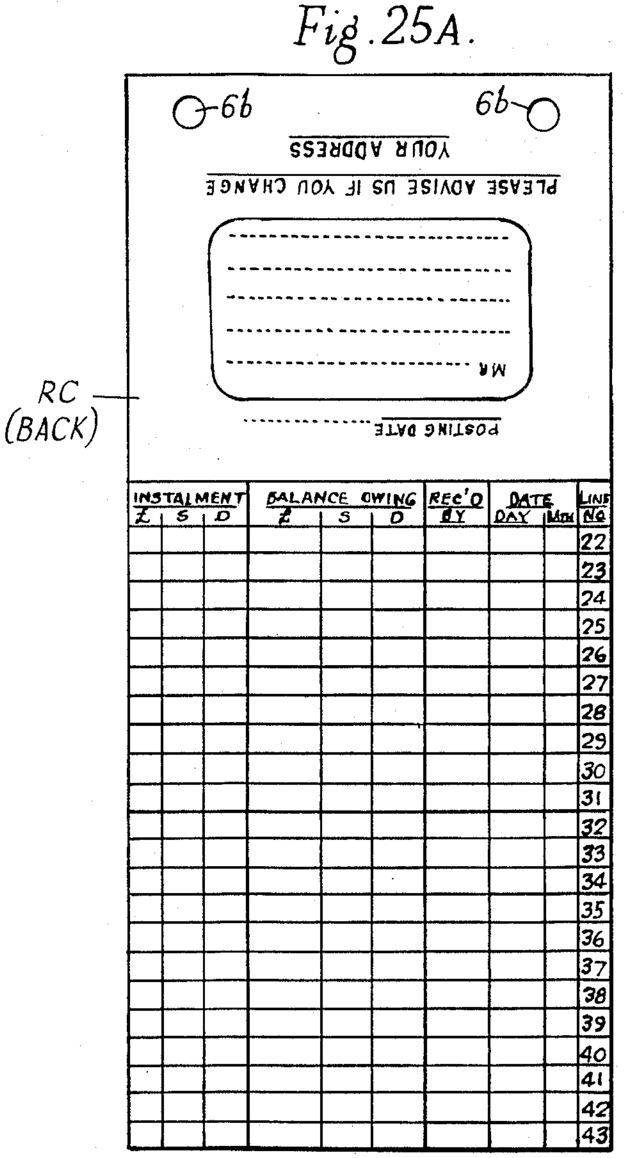

The record card RC having been placed in the inserted position in the record card carrier 6 (in which position it is located by the pins 6*a* on the carrier co-operating with holes 6*b*, seen in FIGURES 25 and 25*a*, in the record card), the assemblage comprising the record card and its carrier is moved to the requisite printing position in the machine, that is to say to the position in which the new printing line on the card is in register with the printing faces of the already set type wheels, by turning the knob KB. Thus this knob is in fast relation with a pair of rack wheels *r, s* which engage two lines of holes 250, 251 on either side of the card carrier so that rotation of the wheels results in movement of the carrier backwardly or forwardly, according to the direction of rotation of the knob KB.

It is impossible to perform a printing operation (i.e., by rotating the operating handle of the machine) if either the token is not in correct position in the token carrier 9 or the record card is not in its carrier.

Thus, as illustrated in FIGURES 20 and 21, as regards the first of these contingencies, there is a slot 260 in the edge of the token T and a corresponding slot 261 in the edge of the token carrier, and when the token is in correctly placed position in the carrier these two slots are in exact register with one another, so enabling the nose portion 262 of a pawl 263, pivoted at 264, to pass from the full line position (in FIGURE 20) to the chain line position.

Attached to the spindle H of the operation handle of the machine is an arm 265, and in the path of this arm is a pin 266 fixed to an arm 267. A link 268 is pivotally connected at one end thereof to the pawl 263 and at the other end to a plate 269. Plate 269 is swingable about a fixed pivot 270 and is permissively connected with arm 267 through a pin 271 on the plate 269 in abutting relation to an edge 272 on the arm 267, said pin co-operating with a torsion spring 273 anchored at the opposite ends thereof to the plate and the arm respectively. Plate 269 is also connected to a lever 274 through a pin 275 thereon working in a slot 276 in the plate 269. On lever 274 is a stop plate 277. When arm 265 is moved by rotation of the operating handle of the machine, pin 266 moves arm 267 downwardly, and consequently link 268 upwardly and pawl 263 clockwise, until pawl 263 is obstructed from further movement by the stop plate 277. The insertion of the token into its carrier moves a tag 280, pivoted at 281 to swing to the chain line position (FIGURE 21) from the full line position, to which it is biassed by a spring 282, to said chain line position and thus to non-blocking position relatively to the nose portion 262 of pawl 263. The nose portion can now enter the co-registering slots 260, 261, with the result that pawl 263 can rotate to the chain line position. This enables the lever 274 to be deflected (by further rotation of the operating handle of the machine) sufficiently for pin 266 to pass stop plate 277, thereby enabling the operating handle to complete its rotation through a full circle. Lever 274 is kept in the clearance position by means of a cam 283 fast with shaft H and working against a follower roller 284 on the lever 274, until the printing cycle has been completed. Such an arrangement prevents fraudulent printing by removal of the token. A second cam 285, also fast with shaft H, acts against a roller 286 on lever 274 to return the lever 274 before the operating handle comes to rest, the cam adding its thrust to the pull of a tension spring 287 operating in the direction to return the lever 274 to its normal (full line) position.

A generally similar interlock is provided to take care of the second of the above mentioned contingencies, as will appear from FIGURE 22. Thus the arrangement there shown comprises exactly the same elements as the arragnement shown in FIGURES 20 and 21 except that it omits the parts 261, 262, 263, 264, 280, 281, 282, 283, 284, 285, and 286. Instead link 268*a* is prevented from moving upwardly to the chain line position (so freeing the operating handle for the completion of its operative cycle of movement) by a lever 288. This lever is biassed to its full line position and is displaced from this position to the chain line position in which it ceases to intercept the upward movement of the link 268*a*, by the edge of the record card RC as the latter is inserted into position in its carrier 6.

Referring now to the dating mechanism (FIGURES 14 to 17), the three type wheels *j, k, l* which carry type faces representing, as regards those carried on the first two wheels, the days of the month and, as regards those carried on the wheel *l*, which may be, for example, the first twelve letters of the alphabet, the month of the year, are set by hand through turning knobs 300, 301, 302 operatively connected respectively with the three type wheels *j, k, l* through a short toothed wheel train.

Thus knob 300 is connected to the type wheel *j* through a toothed wheel 300*a* meshing with a second toothed wheel 300*b* in turn meshing with toothed wheel 59 (associated with type wheel *j*); knob 301 is connected to the type wheel *k* through a toothed wheel 301*a* meshing with a second toothed wheel 301*b* in turn meshing with toothed wheel 60 (associated with type wheel *k*); knob 302 is connected to the type wheel *l* through a toothed wheel 302*a* meshing with a second toothed wheel 302*b* in turn meshing with toothed wheel 61 (associated with type wheel *l*).

The three wheels 300*a*, 301*a*, 302*a* are respectively carried upon three spindles 303, 304, 305 in fast relation thereto, and the three knobs 300, 301, 302 are also carried upon these spindles in fast relation thereto.

The three wheels 300*b*, 301*b*, 302*b* are loosely mounted on a stationary carrier spindle therefor 306 and the various parts of the mechanism are all carried upon a frame plate 307 in turn carried upon the main side frame 2 of the lower unit B of the machine.

Associated with the three knobs 300, 301, 302 are three stationary pointers 300*c*, 301*c* and 302*c*. These pointers are carried upon a plate 308 and they point respectively to markings on the peripheries of the knobs corresponding to the symbols on the type faces aforesaid carried on the three type wheels *j, k, l*. The pointers therefore show, in conjunction with markings on the knobs, the setting of the corresponding type wheels.

The transfer lever 12 cannot be moved to its lowered (instalment) position until one or more of the keys 11 have been moved from zero position, i.e., the lowermost position, which corresponds to the zero setting of the corresponding type wheel of the groups I and II.

For this purpose there is fixed to link 70 a plate 310. If the transfer lever is depressed before operation of one or more of the keys 11 this plate 310 will be interfered with by extension 311 of a rocking arm 312 pivotally mounted on rod 20 for swinging movement in a vertical plane and spring urged, by tension spring 312*a*, in the clockwise direction. When, however, any one of the keys 11 is moved away from zero position an angled edge 313 on the corresponding rack bar deflects the arm 312 in a counter-clockwise direction, through the intermediary of a rod 314 extending across the machine and affixed at its opposite ends to, respectively, the arm 312 and a second arm 312*a*, also pivotally mounted on the rod 20, thus allowing plate 310, and with it link 70, to move as required. If, however, the operator has set up the old balance in the machine (by operation of the appropriate keys), depressed the transfer lever, moved the keys to the instalment recording position, and then should realize that the old balance figure he has set up is incorrect, then the "Cancel" button 314 cannot be depressed to clear the transfer lever, through the intermediation of a lever 315 (operated by the button in the manner clearly apparent from FIGURE 3), a nose 315*a* on the free end of lever 315, a cooperating nose 312*b* on rocking arm 312, said nose 312*b* being normally located in a non-interfering position with respect to nose 315*a*, i.e., when the parts are in their machine-at-rest position, but brought into an interfering position with respect to nose 315*a* whenever any one of the keys is operated, through the resulting counter-clockwise movement of arms 312 and 312*a*, the rocking arms 312 and 312*a*, the rod 314 and the plate 311, until the keys have all been returned to zero position. This ensures that the balance printing type wheels of group II are at their correct zero recording position at the commencement of a cycle of use of the machine.

*Operation*

The operations in using the machine are performed in the following sequence:

(1) Insert token.

(2) Move keys to required positions (including the zero position) to set the type wheels of group I at the positions in which they represent the value of the old balance.

(3) Depress transfer lever.

(4) Move keys to the required positions (including the zero position) to set the type wheels of groups I and II at the positions in which the type wheels of group I represent the value of the instalment.

(5) Insert the record card.

(6) Adjust the position of the record card carrier, by rotation of its operating knob, to the position in which it brings the record card, in inserted position within it, to the position at which the new printing line on the card is in register with the printing position C.

(7) Set the date type wheels (group III); this operation can, however, be performed at any stage prior to the next following operation, or at the beginning of each day.

(8) Release operating handle, by manipulation of pin 12*a* to its ineffective position.

(9) Rotate operating handle through a complete revolution.

The operating handle cannot be rotated through more than about 30° if either the token is not in position in the machine or the record card is not in position—owing to the interlock mechanisms illustrated in FIGURES 20, 21 and 22, and it cannot be rotated anti-clockwise once it has passed the interlock-clear position.

It remains to remark that the two machine units A and B are separately enclosed in casings $A_1$, $B_1$, and in these casings is a window $A_2$, through which the totals register F can be read, a second window $A_3$ through which the condition of the take-up reels 217, 221 and 226 can be ascertained (by looking through the window), and a third window $B_2$ through which the condition of the supply roll RL can be ascertained.

The accompanying Diagram A illustrates the action of the machine as regards the subtraction unit. The diagram is in two parts—an upper part which illustrates the case where the old balance as set up in the machine is £15:0:0 and the instalment is £3:0:0, making the new balance, as eventually printed in the machine, by the printing wheels 8, consequent upon rotation of the operating handle 13 in the manner herein before described, £12:0:0: and a lower part which illustrates the case where the old balance is again £15:0:0 but the instalment is £9:0:0, making the new balance £6:0:0.

The action in the two cases is as follows:

*First case.*—The machine is initially at rest, all of the keys and all of the balance printing wheels 8 being at zero.

The old balance (£15) is now set up by moving the keys to the positions 1–5–0–0–0. The main racks 19 are now in their old balance positions. The balance printing wheels 8 are, however, still at zero, as the transfer lever 12 has not yet been lowered and, therefore, the secondary racks 46 are still in the lowered (out-of-mesh) position with respect to the gears 47 of the subtraction unit.

The transfer lever is now lowered.

The keys are still in the positions 1–5–0–0–0 and the balance printing wheels are still at zero.

The instalment (£3) is now set up in the machine, by moving the keys of the pounds and tens of pounds sections to respectively the 3 and 0 positions. The keys are now in the positions 0–3–0–0–0 and the balance printing wheels 8 at the positions 1–2–0–0–0, the setting up of the instalment having resulted in movement of the pounds wheel from position 0 to position 2 and of the tens of pounds wheel from position 0 to position 1. The setting up of the instalment has also resulted, simultaneously with the movement of the pounds wheel, in movement of the cam CC of the pounds section in the backward (anti-clockwise in FIGURES 3, 9 and 11) direction from the initial (zero) position of the cam.

The operating handle 13 of the machine is now rotated. An early effect of rotating this handle is to lower all of the racks RK of the subtraction unit into mesh with the corresponding gears GG (48 in FIGURE 11). Further early effects of this step are (*a*) to move all of the secondary racks 46 out of mesh with the corresponding gears 47 of the subtraction unit and (*b*) to apply yielding pressure, in the direction to the right in FIGURES 3, 9, 11, 12 and 13, to all of the rack carriers P of the unit through the arms AA.

In the case considered, however, the rack carrier P of the tens of pounds section cannot move under the pressure thus applied to it from the operating handle (with resulting return movement through one digital arc of movement towards the zeroised position of the associated gears GG) since it is intercepted by the stop TP of the lever AA of the pounds section, the cam CC of that section having been rotated in the backward direction and, therefore, in the direction in which it is free from interception by the feeler FE of the lever AA with resulting displacement of the latter about its pivot to a position in which the stop TP on the lever is in a non-intercepting position relatively to the rack carrier P of the tens of pounds section.

The pounds and tens of pounds balance printing wheels 8 therefore remain in the positions 1–2 to which they were brought prior to the rotation of the operating handle 13 in readiness (as regards position) for the printing phase of the operating cycle of the machine, which printing phase follows at a later stage in the rotation of the handle. As indicated in the diagram, therefore, the balance printing wheels of the machine now stand at the positions 1–2–0–0–0, i.e., at positions which represent the new balance, namely, £12 (15 minus 3=12).

With the balance printing wheels having thus been brought to the new balance representing positions, the following further operations (which are not shown on the diagram) take place in the machine in consequence of further rotation of the operating handle:

(1) Printing wheels are locked in the positions to which they have been brought, by movement of locating pawls 190 to effective position.

(2) Hammers 1 are raised and lowered to effect the printing operation.

(3) Printing wheels are unlocked, by return movement of the locating pawls to ineffective position.

(4) All the gear trains in the subtraction unit are zeroised (by the action of the zeroising cams ZC).

(5) Total register F is placed in mesh with main racks 19.

(6) Main racks 19 are returned to initial position (full line position in FIGURE 3), with resulting return of instalment printing wheels to zero positions 0–0–0–0, and operation of (*a*) totals register F and (*b*) indicator NW.

*Second case.*—The various operations are the same in this case as in the first case, as the diagram shows. It will be seen however that whereas in the first case the pounds section cam CC was rotated from zero position in the backward (anti-clockwise) direction, in the second case it is rotated in the reverse (clockwise) direction, with consequent movement of the corresponding (pounds-section) lever AA to a position in which the stop TP on the lever is removed from the path of the rack carrier P of the tens of pounds section, thereby leaving the carrier and the rack (now in mesh with the associated gear GG) free to be displaced to the right, under the yielding thrust subsequently applied to it by the arm AA, with resulting return movement of gear GG through one digital arc of movement towards the zero position.

In this case, therefore, as the diagram shows, the setting up of the instalment results in the shifting of the pounds balance printing wheel from position 0 to position 6, and the tens of pounds balance printing wheel from position 0 to position 9, with the result that the five wheels are now in the positions 9–6–0–0–0. Subsequently, however, the tens of pounds of printing wheel becomes returned to position 0 by the cancelling out action of the pounds cam CC with respect to the tens of pounds gear GG under drive from the operating handle 13 of the machine. Finally therefore the five balance printing wheels stand, in readiness for the printing operation, at the position 0–6–0–0–0, in which they represent the new balance, namely £6 (15 minus 9=6).

It may be stated, therefore, that fundamentally the substraction unit comprises a succession of sections including a "first" section and a "second" section corresponding respectively to a lower-position figure (which is the pounds figure in the two cases considered in the diagram) and the next higher position figure (the tens of pounds figure in said two cases) of the minuend, subtrahend and remainder elements of the subtraction which is performed in the unit. The "minuend" element, in the two cases visualised in the diagram, is the old balance figure, the "subtrahend" element the instalment figure and the "remainder" element the new balance figure.

The "second" (tens of pounds) section includes a gear (GG) which occupies a zeroised position (the position marked "ZERO" in the diagram) at the commencement of the subtraction and in a first phase of the subtraction (setting up the instalment) is rotated forwardly or backwardly from said zeroised position, according to whether the digital value (in tens of pounds units in the two cases considered in the diagram) of the figure of the subtrahend (instalment) to which the "second" section of the unit belongs is greater than or smaller than that of the corresponding figure of the minuend (old balance), the movement of the gear being proportional to the difference between these values, and said "first" section including a rotary control member (cam CC) for said gear (GG) which also occupies a zeroised position at the commencement of a subtratcion and is also in said first phase (setting up the instalment) rotated forwardly or backwardly from said zeroised position, according to whether the digital value (in tens of pounds units in the two cases considered in the diagram) of the figure of the subtrahend (instalment) to which the "first" section of the unit belongs is greater than or smaller than that of the corresponding figure of the minuend (old balance).

Associated with the aforesaid gear (GG) and control member therefor (CC) are means operatively connecting the control member and the gear in such manner that in a later phase of the subtraction (as operating handle 13 of machine is rotated, subsequently to setting up of instalment) the gear is automatically returned towards its zeroised (initial) position through one digital arc of movement in the event of the movement of the control member having been in the forward direction (from the position 5 to the position 9 in the second of the cases considered in the diagram).

The said operating means, in the particular machine described and illustrated, includes the following elements:

(1) A lever (AA) located in the "first" section of the unit and movable (by cam CCC) between a first position (in which it appears in FIGURE 9 and in all five of the phases illustrated in the fourth column of the upper part of the diagram) in which a feeler (FE) on the lever intercepts the cam (CC) and a second position (in which it appears in FIGURES 12 and 13 and in the lowermost three of the phases illustrated in the fourth column of the lower part of the diagram), to which the lever is brought by forward rotation of the cam from its zeroised position, the lever remaining in the first position if the cam is rotated backwardly (as in the first case of the diagram), said lever carrying a stop (TP) which protrudes from the "first" section of the unit into the "second" section.

(2) A rack (RK) located in said "second" section and movable into mesh with the gear (GG) of that section subsequently to rotation thereof from the zeroised position.

(3) A carrier (P) for the rack. This carrier is also located in the "second" section of the unit and the rack is pivotally mounted upon it for movement into and out of mesh with the gear (GG). The carrier (P) is reciprocatable between a first position (in which it appears in FIGURES 3, 9, 11 and 12 and also in all five phases illustrated in the fifth column of the upper part of the diagram) which it occupies at the commencement of a subtraction and a second position (in which it appears in FIGURE 13 and also in the lowermost of the phases illustrated in the fifth column of the lower part of the diagram) to which it is brought by yieldable urging means (lever LR, spring SP and arm AM) after the rack has been moved into mesh with the gear and only in the event of the lever (AA) having been moved (by cam CCC) to the said second position (FIGURES 12 and 13) thereof. Stop (TP) then occupies a position (in which it appears in FIGURES 12 and 13 and also in the lowermost three of the phases illustrated in the fifth column of the lower part of the diagram) in which it is clear of the path of the carrier, while in said first position (FIGURES 9 and 11) of the lever the stop intercepts said path, the movement of the carrier (P) to said second position (FIGURE 13) resulting, through the intervention of the rack (RK), in the aforesaid return movement of the gear GG through one digital arc of movement toward the initial (zeroised) position of the gear.

It will be understood that whilst, as stated, the subtraction unit of the machine of this invention comprises fundamentally two sections—a "first" section and a "second" section, a gear (GG) in the "second" section, a control member (CC) therefor in the "first" section and an interconnection between these elements (lever AA, rack RK and rack carrier P) all as described in the foregoing, the actual unit may comprise more than two such sections, the three or more sections being arranged in cascade relation to one another throughout the series in the sense that the control member (CC) of each lower-position section of the unit is in control (influencing) relation to the next higher position section, each successive section in the series being a "second" section with respect to the section next below. It will be seen that such an arrangement is employed in the particular embodiment of the invention illustrated in the drawings.

According to the embodiment of the invention illustrated in FIGURES 26 to 29 the machine comprises a manually operable keyboard by means of which a plurality of type wheels is set to a printing position and a pair of operating handles H, $H_1$ which, when operated in a predetermined order, cause data to be recorded during a machine cycle and a machine cycle to be completed as hereinafter explained.

The keyboard consists of a set of four keys 1, 2, 3, 4 each of which is connected to the forward end of a rack 5, 6, 7 or 8, which extends from a point near the front of the machine towards the rear thereof. The stems *s* upon which the keys are mounted and by which they are connected to the racks are arranged to move, when manually operated, along slots S cut in the machine casing, said slots being graduated to represent, respectively, pence, units shillings, tens of shillings and units pounds.

There are, therefore, four axially aligned type wheels $T_1$, $T_2$, $T_3$, $T_4$ in the machine, one ($T_1$) being provided with twelve type faces engraved with the numerals 0 to 11 for pence, one ($T_2$) being provided with two type faces engraved respectively with the numerals 0 and 1 for tens of shillings and two ($T_3$, $T_4$) being provided with ten type faces engraved with the numerals 0 to 9 for units shillings and units pounds. Each type wheel is secured to a gear wheel *g* which meshes with a train of gear wheels $g_1$, $g_2$, $g_3$, $g_4$, of which one ($g_4$) meshes with the teeth of its associated rack 5, 6, 7 or 8.

The operating handle H is secured to a main shaft S which extends across the full width of the machine. The other operating handle $H_1$ is secured to a cylindrical shaft $S_1$ which is coaxial with the main shaft S.

Handle H is operatively connected to a first hammer *h*, and handle $H_1$ is operatively connected to a second hammer $h_1$, by means of cams and a system of levers and links, a cam being mounted on the shaft $S_1$ for actuation of the first hammer *h*, and another cam $C_1$ being mounted on the main shaft S for actuation of the second hammer $h_1$. A third cam $C_2$ is secured to the main shaft S and is provided to operate mechanism which ensures the feed of webs of tally roll through the machine and which ensures the rewinding of the said webs. Thus, for example, a reel of tally rolls R is mounted in the machine, said reel consisting of two webs of tally roll paper separated by a web of double faced carbon paper, one of the webs of tally roll paper also being carbon-backed over a portion of its width. The two webs of tally roll paper and the web of carbon paper are drawn upwardly through the machine by a pair of rollers *r*, $r_1$, which are rotated by a pawl *p* and ratchet wheel *rw*, and each of the three webs is rewound on a separate spool which is rotated by a pawl $p_1$ and ratchet wheel $rw_1$. All the pawls are moved around the peripheries of their associated ratchet wheels in, for example, a clockwise direction of rotation and thereafter in an anti-clockwise direction of rotation, to cause rewinding as aforesaid by the third cam $C_2$ through the intermediary of a link L.

Means are associated with each of the racks hereinbefore referred to, said means causing the setting of a numerator (for example, a numeral wheel N) to be varied by an amount equal to that represented by the setting of the rack. Thus, associated with each rack 5, 6, 7, 8, is a second rack $5_a$, $6_a$, $7_a$ and $8_a$. These racks, which are moved in timed sequence with the main racks through a cam $C_3$ fast with the main shaft S, an arm A in follower relation to cam 3 and a link $L_1$ pivotally connected at one end to the arm A and at the other end to the associated rack $5_a$, $6_a$, $7_a$ or $8_a$, operate the numeral wheels N through intervening trains of toothed wheels *w* in continual mesh with the racks.

The following describes a machine cycle:

It will be assumed that a customer enters a shop with the intention of paying £1.11.6*d.* which will be deducted from a credit balance which has been given to him. The shop assistant operating the machine described above will firstly set the keyboard so that each of the units pounds, tens of shillings and units shillings key-tops is adjacent the numeral 1 and so that the pence key-top is adjacent the numeral 6. The movement of the racks to which the key-tops are secured ensures that the type wheels at the rear of the machine are set to print the correct data.

The machine is to be employed to record data both on the tally record webs and on a customer's record card similar to or identical with that described and illustrated in our co-pending patent application No. 28,903 of 1958. Thus, a record card having (see FIGURE 29) a type face *t* representing a customer's reference number is inserted into the machine by way of a slot *s t* (FIGURE 28*a*) in the side of the machine casing in such a manner that, when the handle H is operated, the first hammer *h* causes the type face on the record card to print the customer's reference number on the two tally record webs.

The shop assistant then removes the record card from the machine and inserts that part of the card upon which data is to be recorded into the machine in such a manner that the two tally record webs are disposed between the card and the type wheels. The tally record web adjacent the record card is that web which is carbon-backed over a portion of its width, and the carbon backing faces the record card. Handle $H_1$ is then operated with consequent operation of the second hammer $h_1$. This hammer causes the type faces of the four type wheels to print (in columns preprinted on the record card and marked £ s. d.) "1" in the pounds column, "11" in the shillings column and "6" in the pence column and also, therefore, to record this payment on the tally record webs.

Furthermore, when the handle $H_1$ has been operated, but after printing of the record card is completed, the racks, which are held in their set position by detent means, consisting of the notches *n* in the lower edges of the racks and co-operating spring controlled detent levers *d l*, are released and are restored to their rest position by spring means (not shown). During this rearward movement of the racks, those means by which numerators N are advanced cause the amount £1. 11. 6d. to be added into the "cash received" register which is formed by the various numerators. The numerators have carry-over means situated between them similar to those employed in, for example, calculating machines and it is proposed that the register be capable of visibly recording amounts up to £999. 19. 11d.

Thus, the tally record webs have recorded thereon the customer's reference number and the installment paid by that customer in the following manner:

10975426 1 11 6

The tally record webs may be employed thereafter for audit purposes, for the preparation of punched tapes to be fed into a computer, for direct scanning by so-called "reading" machines or the like.

The machine is provided also with a guillotine for removing an edge portion of the record card for the purpose described in our co-pending application No. 28,903 of 1958; with interlocks which prevent operation of handle $H_1$ if handle H has not been operated; and with locking means for maintaining handle H in its operated position until handle $H_1$ has been operated.

What I claim as my invention and desire to secure by Letters Patent of the United States is:

1. A subtraction unit comprising a succession of sections including a first section and a second section corresponding respectively to a lower order digit and the next higher order digit of the minuend element, of the subtrahend element and of the remainder element of a subtraction operation, said second section including a gear which occupies a zero position at the commencement of a subtraction operation and which, in a first phase of the subtraction, is rotated forwardly or backwardly from such zero position according to whether the value of the higher order digit of the subtrahend is greater or smaller than the value of the digit of corresponding order of the minuend, the movement of the gear being proportional to the difference between these values, said first section including a stepped rotary cam associated with said gear, the cam occupying a zero position at commencement of subtraction and further, during the first phase of subtraction being rotated forwardly or backwardly from the zero position according to whether the value of the lower order digit of the subtrahend is greater or smaller than the value of the digit of corresponding order of the minuend, said unit further comprising means operatively connecting said rotary cam and said gear such that said gear is automatically returned towards zero position through a one digit arc of movement in the event of movement of said cam having been in the forward direction, and said connecting means including a lever located in the first section movable between a first position in which a feeler on the lever intercepts said cam and a second position to which the lever is moved by forward rotation of the cam from said zero position thereof, the lever remaining in its first position if the cam is rotated backwardly, said lever carrying a stop which protrudes into the second section said connecting means further comprising, a rack located in said second section movable into mesh with said gear after rotation of said gear from said zero position and a carrier for said rack also located in said second section, the rack being pivotally mounted upon said carrier for movement into and out of mesh with said gear, said carrier being reciprocable between a first position which it occupies at the commencement of a subtraction and a second position, said connecting means still further comprising yieldable urging means coupled to said rack for bringing said rack into said second position after the rack has been moved into mesh with the gear and only after said lever has been moved to its second position, said stop then occupying a position in which it is clear of the path of the carrier, while in said first position of the lever the stop intercepts said path, said gear being returned towards its zero position by movement of said carrier to said second position and the consequent movement of said rack.

2. A machine to record instalment payments due over a period comprising a printing station means to mount a record web, to remain in the machine over a period of successive recording operations; means to advance said web past said printing station one step for each complete recording operation; means to mount a record card temporarily at said printing station in overlapping relation with respect only to a marginal portion of the record web, the remaining portion of the web forming a first area while said marginal portion of the web forms a second area; means to mount a printing plate temporarily at said printing station in overlapping relation with respect to said first area of the record web, said printing plate carrying first type characters for printing solely on said first area of the record web first data identifying the transaction to which the instalment payment to be recorded relates; a plurality of differentially settable type carriers each carrying a series of second type characters for printing on said second area of the record web and simultaneously on the part of the record card in overlapping relation with respect to the record web second data representing details of the transaction, said type carriers being differentially settable to bring any of said second type characters on said type carriers to printing position at said printing station; means for differentially setting said type carriers to set up thereon said second data representing details of the transaction; and means for applying printing pressure to said second type carriers subsequently to the setting thereof and to the insertion of the printing plate in position in the machine.

3. A machine according to claim 2, wherein said first and second areas of the record web are located abreast of one another transversely of the web.

4. A machine to record instalment payments due over a period, comprising a printing station; means to mount a record web, to remain in the machine over a period of successive recording operations; means to advance the web past said printing station one step for each complete recording operation; means to mount a record card temporarily at said printing station in overlapping relation with respect only to a marginal portion of the record web, the remaining portion of the web forming a first area while said marginal portion of the web forms a second area; means to mount a printing plate temporarily at said printing station in overlapping relation with respect to said first area of the record web, said printing plate carrying first type characters for printing solely on said first area of the record web first data identifying the transaction to which the installment payment to be recorded relates; first differentially settable type carriers each carrying a series of type characters for pinting on said second area of the record web and simultaneously on the part of the record card in overlapping relation with respect to the record web second data representing details of the transactions; means for differentially setting said first type carriers to set up thereon said data representing details of the transaction; second differentially settable type carriers each carrying a series of type characters for printing on the record card the date of payment of the instalment; means for differentially setting said second type carriers to set up thereon said date of payment; and means for applying printing pressure to said first and second type carriers subsequently to the setting thereof and to the insertion of the printing plate in printing position in the machine.

5. A machine according to claim 4, wherein said first and second areas of the record web are located abreast of one another transversely of the web and said date of payment is printed on an area of the record card located, transversely of the card, abreast the area thereof on which said data representing details of the transaction are printed.

6. A machine to record instalment payments due over a period, comprising a printing station; means to mount a record web, to remain in the machine over a period of successive recording operations; means to advance the web past said printing station one step for each complete recording operation; means to mount a record card temporarily at said printing station in overlapping relation with respect only to a marginal portion of the record web, the remaining portion of the web forming a first area while said marginal portion of the web forms a second area; means to mount a printing plate temporarily at said printing station in overlapping relation with respect to said first area of the record web, said printing plate carrying first type characters for printing solely on said first area of the record web first data identifying the transaction to which the instalment payment to be recorded relates; a plurality of differentially settable type carriers each carrying a series of second type characters for printing on said second area of the record web and simultaneously on the part of the record card in overlapping relation with respect to the record web second data representing details of the transaction; said type carriers being differentially settable to bring any of said second type characters on said type carriers to printing position at said printing station; means for differentially setting said type carriers to set up at said printing station said data representing details of the transaction; and means operating with percussive action for applying printing pressure to said first and second type characters positioned at said printing station subsequently to the setting of said type carriers and to the insertion of the printing plate in position in the machine, said means for applying printing pressure including a plurality of individual hammers allocated respectively to the several first and second type characters and actuating means for said hammers whereby the latter are operable simultaneously but each independently of the others.

7. A machine according to claim 6, wherein the hammers are mounted for reciprocatory movement independently of one another between a machine-at-rest position in which the hammer is spaced a short distance from the corresponding type character and a percussive stroke starting position to which the hammer is brought by said actuating means, the hammers having at the end of their percussive stroke freedom for further movement, beyond the machine-at-rest position of the hammer, to bring the latter to striking position relative to the corresponding type character, said further movement being due solely to inertia forces in the hammer and being performed against the constraint of resilient means operative to return the hammer to the machine-at-rest position.

8. A machine according to claim 6, wherein the hammers are mounted for reciprocatory movement, independently of one another, between a machine-at-rest position in which the hammer is spaced a short distance from the corresponding type character and a percussive stroke starting position to which the hammer is brought by said actuating means, the hammers having at the end of their percussive stroke freedom for further movement, beyond the machine-at-rest position of the hammer, to bring the latter to striking position relative to the corresponding type character, said further movement being due solely to inertia forces in the hammer and being performed against the constraint of resilient means operative to return the hammer to the machine-at-rest position, wherein said actuating means includes in respect of each hammer a driving member therefor movable as one with the hammer between a first position corresponding to the machine-at-rest position of the hammer and a second position corresponding to the percussive stroke starting position thereof, means coupling said member to the hammer with freedom for lost motion between the two parts and light spring means yieldingly maintaining said parts in stationary relation to one another when the machine is at rest and also during movement of the driving member in either direction between said first and second positions, and wherein said actuating means further includes spring loading means for said driving members which are tensioned by the latter as these move from said first position to said second position, and stop means effective against the action of the spring loading means to determine the location of said first position, the tension of said light spring means being such as to be readily overcome by said inertia forces.

9. A machine according to claim 6, wherein the hammers are pivotally mounted for reciprocatory movement, independently of one another, about a fixed axis between a machine-at-rest position in which the hammer is spaced a short distance from the corresponding type character and a percussive stroke starting position to which the hammer is brought by said actuating means, the hammers having at the end of their percussive stroke freedom for further movement, beyond the machine-at-rest position of the hammer, to bring the latter to striking position relative to the corresponding type character, said further movement being due solely to inertia forces in the hammer and being performed against the constraint of resilient means operative to return the hammer to the machine-at-rest position, wherein said actuating means includes in respect of each hammer a driving lever therefor reciprocatable as one with the hammer about said fixed axis, between a first position corresponding to the machine-at-rest position of the hammer and a second position corresponding to the percussive stroke starting position thereof, means coupling said lever to the hammer with freedom for lost motion between the two parts and light spring means yieldingly maintaining said parts in stationary relation to one another when the machine is at rest and also during movement of the lever in either direction between said first and second positions, and wherein said actuating means further includes spring loading means for the driving levers which are tensioned by the latter as these move from said first position to said second position, and stop means effective against the action of the spring loading means to determine the location of said first position, the tension of said light spring means being such as to be readily overcome by said inertia forces.

10. A machine to record installment payments due over a period, comprising an operating handle; a keyboard; means to mount a record web, to remain in the machine over a period of successive recording operations; means to mount a record card, to be inserted in the machine temporarily; means to mount a printing plate, also to be inserted in the machine temporarily, carrying type characters for printing solely on a first area of the record web data identifying the transaction to which the instalment payment to be recorded relates; two groups of differentially settable type wheels, said groups comprising a first group allocated to the printing on a second area of the record web and also on the record card of part of the details of the transaction and a second group allocated to the printing on the record card only of the balance of said details; an operative connection between the keys of the keyboard and the two groups of type wheels whereby the latter are settable to printing position by selective operation of the keys; and means operable under the control of said operating handle for applying printing pressure to the two groups of type wheels subsequently to the setting thereof to printing position and to the printing plate, with the latter in inserted position in the machine.

11. A machine according to claim 10, wherein the printing pressure applying means operates with percussive action.

12. A machine according to claim 10, wherein the first group of type wheels print said part of the details of the transaction on the record card simultaneously with the printing thereof on the record web.

13. A machine according to claim 10, wherein the machine is manually operated and the operating handle is used to perform the whole of the machine cycle, following the setting of the type wheels.

14. A machine to record instalment payments due over a period, said machine being designed as a credit sales machine and comprising means to mount a record web, to remain in the machine over a period of successive recording operations; means to mount a personal record card, to be inserted in the machine temporarily, for the purposes solely of the current recording operation; means to mount a printing plate, also to be inserted in the machine temporarily, carrying type characters for printing solely on a first area of the record web data identifying the transaction to which the instalment payment to be recorded relates; two groups of differentially settable type wheels each carrying a series of type characters, said groups comprising a first group allocated to the printing on a second area of the record web and also on the record card of the value of the instalment payment to be recorded and a second group allocated to the printing on the record card only of the value of the new balance; a first type wheel setting unit drivingly connected to said first group; a second type wheel setting unit drivingly connected to said second group; a keyboard common to the two groups of type wheels; interconnecting means effective to provide an operative connection between the keys of the keyboard and the two groups of type wheels through the two type wheel setting units, the arrangement being such that by first operating the keyboard to enter the value of the old balance and then re-operating it to enter the value of the instalment payment the resultant effect will be to set the first group of type wheels at printing positions in which the type characters on the wheels represent the value of the instalment payment and the second group of type wheels at printing positions in which the type characters on the wheels represent the value of the new balance; and means for applying printing pressure to said first and second groups of type wheels subsequently to the setting thereof and to the printing plate in inserted position in the machine.

15. A machine according to claim 14, wherein said interconnecting means includes a set of main racks operable selectively by the keys of the keyboard and in constant driving connection each with a corresponding wheel train in the first type wheel setting unit in turn in constant driving connection with an associated type wheel of the first group, and a set of secondary racks also operable selectively by the keys of the keyboard and in driving connection each with a corresponding wheel train in the second type wheel setting unit in turn in constant driving connection with an associated type wheel of the second group, only during the second stage of operation of the keyboard.

16. A machine according to claim 14, including means for causing each wheel train of the second type wheel setting unit which is connected to a higher position type wheel to be operated in the direction to step back the associated type wheel by one digital distance whenever the numerical magnitude of the next lower position figure of the instalment upon entry thereof in the machine following the entry of the old balance is greater than what it was prior to said entry of said figure.

17. A machine according to claim 14, wherein the second type wheel setting unit comprises a succession of sections corresponding respectively to the series of type wheels which print the value of the new balance, said succession including a first section and a second section corresponding respectively to a lower position and the next higher position type wheel of the series, said second section including a gear which occupies a zeroised position prior to the entry of the instalment value in the machine and in a first phase of the operation of the unit is rotated forwardly or backwardly from said zeroised position according to whether the digital value of the figure of the instalment value to which the second section belongs is greater than or smaller than that of the corresponding figure of the old balance value, the movement of the gear being proportional to the difference between these values, and said first section including a rotary control member for said gear which also occupies a zeroised position prior to said entry of the instalment value and is also in said first phase rotated forwardly or backwardly from said zeroised position according to whether the digital value of the figure of the instalment value to which the first section of the unit belongs is greater than or smaller than that of the corresponding figure of the old balance value, and means operatively connecting said control member and said gear in such manner that in a later phase of the operation of the unit said gear is automatically returned towards said zeroised position through one digital arc of movement in the event of the movement of the control member having been in the forward direction.

18. A machine according to claim 14, wherein the second type wheel setting unit comprises a succession of sections corresponding respectively to the series of type wheels which print the value of the new balance, said succession including a first section and a second section corresponding respectively to a lower position and the next higher position type wheel of the series, said second section including a gear which occupies a zeroised position prior to the entry of the instalment value in the machine and in a first phase of the operation of the unit is rotated forwardly or backwardly from said zeroised position according to whether the digital value of the figure of the instalment value to which the second section belongs is greater than or smaller than that of the corresponding figures of the old balance value, the movement of the gear being proportional to the difference between these values, and said first section including a stepped rotary cam which also occupies a zeroised position prior to said entry of the instalment value and is also in said first phase rotated forwardly or backwardly from said zeroised position according to whether the digital value of the figure of the instalment value to which the first section of the unit belongs is greater than or smaller than that of the corresponding figure of the old balance value, a lever located in the first section of the unit and movable therein between a first position in which a feeler on the lever intercepts said cam and a second position, to which the lever is brought by forward rotation of the cam from said zeroised position thereof, the lever remaining in the first position if the cam is rotated backwardly, said lever carrying a stop which protrudes into the second section of the unit, a rack located in said second section and movable into mesh with said gear therein subsequently to rotation thereof from said zeroised position and a carrier for said rack also located in said second section, the rack being pivotally mounted upon said carrier for movement into and out of mesh with said gear and said carrier being reciprocatable between a first position which it occupies prior to the entry of the instalment value in the machine and a second position to which it is brought by yieldable urging means after the rack has been moved into mesh with the gear and only in the event of said lever having been moved to said second position thereof, said stop then occupying a position in which it is clear of the path of the carrier, while in said first position of the lever the stop intercepts said path, the movement of the carrier to said second position thereof resulting, through the intervention of the rack, in return movement of the gear towards said zeroised position thereof through one digital arc of movement.

19. A machine according to claim 14, wherein said interconnecting means includes a set of main racks operable selectively by the keys of the keyboard and in constant driving connection each with a corresponding wheel train in the first type wheel setting unit in turn in constant driving connection with an associated type wheel of the first group, and a set of secondary racks also operable selectively by the keys of the keyboard and in driving connection each with a corresponding wheel train in the second type wheel setting unit in turn in constant driving connection with an associated type wheel of the second group, only during the second stage of operation of the keyboard, said secondary racks being moved into and out of driving connection with the associated wheel trains by means of a transfer lever operable simultaneously on all of the racks.

20. A machine to record instalment payments due over a period, comprising means to mount a record web, to remain in the machine over a period of successive recording operations; means to mount a unit comprising a record card and a printing plate incorporated with the card and carrying type characters for printing solely on a first area of the record web data identifying the transaction to which the instalment payment to be recorded relates; differentially settable type carriers each carrying a series of type characters for printing on a second area of the record web and simultaneously on the record card data representing details of the transaction, said means to mount said unit comprising a first part and a second part adapted respectively to receive the printing plate portion of the unit and the record card portion of the unit, the unit being insertable in the machine twice in each successive recording operation, once with the printing plate portion received in said first part of the mount means and once with the record card portion received in said second part of the mount means; means for differentially setting said type carriers; a first pressure applying means for applying printing pressure to said printing plate portion with the latter in inserted position in said first part of the mount means; and a second pressure applying means for applying printing pressure to said type wheels subsequently to the setting thereof and with said record card portion in inserted position in said second part of the mount means, said first and second pressure applying means being operable successively.

21. A machine to record instalment payments due over a period, comprising a first operating handle; a second operating handle; a keyboard; means to mount a record web, to remain in the machine over a period of successive recording operations; means to mount a unit comprising a record card and a printing plate incorporated with the card and carrying type characters for printing solely on a first area of the record web data identifying the transaction to which the instalment payment to be recorded relates; differentially settable type wheels for printing on a second area of the record web and simultaneously on the record card data representing details of the transaction, said means to mount said unit comprising a first part and a second part adapted respectively to receive the printing plate portion of the unit and the record card portion thereof, the unit being insertable in the machine twice in each recording operation, once with the printing plate portion received in said first part of the mount means and once with the record card portion received in said second part of the mount means; an operative connection between the keys of the keyboard and said type wheels whereby the latter are settable to printing position by selective operation of the keys; a first pressure applying means operating with percussive action and under the control of said first operating handle for applying printing pressure to said printing plate portion with the latter in inserted position in said first part of the mount means; and a second printing pressure applying means operating with percussive action and under the control of said second operating handle for applying printing pressure to said type wheels subsequently to the setting thereof and with said record card portion in inserted position in said second part of the mount means, said first and second pressure applying means being operable successively.

22. A machine to record installment payments comprising a printing station, means for mounting a record web in the machine for recording successive unrelated installment transactions, means for mounting a record card temporarily at said printing station in overlapping relation with respect to the record web for recording an individual installment transaction, means for mounting a printing plate temporarily at said printing station in overlapping relation with respect to a portion of the web for recording customer identification data on the web, two groups of differentially settable type wheels, each wheel carrying a series of type characters, said groups comprising a first group for printing on the record web and the record card the value of the installment payment to be recorded and a second group for printing on the record card only the value of the new balance due, a first type wheel setting unit drivingly connected to said first group of type wheels, a second type wheel setting unit, means for selectively engaging said second setting unit with said second group of type wheels, a keyboard having a plurality of keys common to said two groups of type wheels, interconnecting means for coupling said keys to said first and second type wheel setting units, said keys being operable to initially set said first group of type wheels to a position representative of a customer's old balance due and, upon actuation of said selective engaging means, to set simultaneously said first group of type wheels to a position representative of an installment payment and said second group of type wheels to a position representative of the customer's new balance due.

(References on following page)

References Cited in the file of this patent

UNITED STATES PATENTS

| | | |
|---|---|---|
| 546,427 | Norcross | Sept. 17, 1895 |
| 1,251,887 | Hoffman | Jan. 1, 1918 |
| 2,013,533 | Buhler | Sept. 3, 1935 |
| 2,253,229 | Christian | Aug. 19, 1941 |
| 2,496,357 | Rainey | Feb. 7, 1950 |
| 2,577,395 | Zurbuchen | Dec. 4, 1951 |
| 2,582,187 | Wolowitz | Jan. 8, 1952 |
| 2,645,418 | Fleming | July 14, 1953 |
| 2,647,459 | Murphy | Aug. 4, 1953 |
| 2,686,469 | Toggenburger | Aug. 17, 1954 |
| 2,765,733 | Gollwitzer | Oct. 9, 1956 |
| 2,803,187 | Hart et al. | Aug. 20, 1957 |
| 2,894,449 | Boyden | July 14, 1959 |
| 2,909,221 | Hopp | Oct. 20, 1959 |
| 2,916,989 | Boyden et al. | Dec. 15, 1959 |
| 2,921,515 | Weingart | Jan. 19, 1960 |
| 2,931,291 | Hopp | Apr. 5, 1960 |

UNITED STATES PATENT OFFICE
CERTIFICATE OF CORRECTION

?atent No. 3,184,160 May 18, 1965

Vernon Watkins Sparrow

It is hereby certified that error appears in the above numbered patent requiring correction and that the said Letters Patent should read as corrected below.

Column 2, lines 11 and 12, for "operaions" read -- )perations --; column 5, line 25, after "of" insert -- payment )f --; line 44, for "including" read -- included --; column 7, .ine 21, for "10c" read -- 11c --; column 8, line 9, strike out 'of", first occurrence; column 10, line 4, for "trans" read -- :rains --; line 39, for "is" read -- it --; column 12, line 60, :or "operation" read -- operating --; column 17, line 5, for 'subtratcion" read -- subtraction --; column 19, line 43, for 'Furthermore" read -- Further --; column 20, line 36, after 'section" insert a comma; line 37, after "comprising" strike out :he comma; line 39, strike out "and" and insert instead a comma; ame column 20, line 56, after "station" insert a semicolon; olumn 21, line 31, for "pinting" read -- printing --.

Signed and sealed this 23rd day of November 1965.

SEAL)
ttest:

RNEST W. SWIDER
ttesting Officer

EDWARD J. BRENNER
Commissioner of Patents